US010404404B2

(12) United States Patent
Gao et al.

(10) Patent No.: US 10,404,404 B2
(45) Date of Patent: Sep. 3, 2019

(54) ACTIVATION AND DEACTIVATION OF SEMI-PERSISTENT CSI REPORTING

(71) Applicant: Telefonaktiebolaget LM Ericsson (publ), Stockholm (SE)

(72) Inventors: Shiwei Gao, Nepean (CA); Sebastian Faxér, Järfälla (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/299,764

(22) Filed: Mar. 12, 2019

(65) Prior Publication Data
US 2019/0222349 A1 Jul. 18, 2019

Related U.S. Application Data

(63) Continuation of application No. PCT/IB2019/050203, filed on Jan. 10, 2019.
(Continued)

(51) Int. Cl.
*H04L 1/00* (2006.01)
*H04L 5/00* (2006.01)
(Continued)

(52) U.S. Cl.
CPC ......... *H04L 1/0027* (2013.01); *H04B 7/0626* (2013.01); *H04L 1/0003* (2013.01);
(Continued)

(58) Field of Classification Search
CPC ... H04B 7/0626; H04L 1/0003; H04L 1/0026; H04L 1/0027; H04L 1/1812; H04L 5/0053; H04W 72/0406; H04W 72/1205
See application file for complete search history.

(56) References Cited

U.S. PATENT DOCUMENTS 9,391,736 B2 * 7/2016 Nayeb Nazar ........ H04L 1/0027
9,591,631 B2 * 3/2017 You ........................ H04L 5/001
(Continued)

OTHER PUBLICATIONS

"3GPP TS 38.214 V15.0.0: 3rd Generation Partnership Project; Technical Specification Group Radio Access Network; NR; Physical Layer procedures for data (Release 15)," 3GPP, published Dec. 2017—pp. 1-71 (Year: 2017).*
(Continued)

*Primary Examiner* — Asad M Nawaz
*Assistant Examiner* — Thomas R Cairns
(74) *Attorney, Agent, or Firm* — Withrow & Terranova, PLLC

(57) ABSTRACT

Systems and methods for validating a control message for activation or deactivation of Semi-Persistent Channel State Information (SP-CSI) reporting in a wireless communication system are disclosed. In some embodiments, a method performed by a wireless device for validating a control message for activation or deactivation of SP-CSI reporting in a wireless communication system comprises receiving, from a network node, a control message for activation or deactivation of the SP-CSI reporting. The method further comprises making, based on the control message, a determination as to whether to activate the SP-CSI reporting or to deactivate the SP-CSI reporting and activating or deactivating the SP-CSI reporting in accordance with the determination. In this manner, the wireless device is enabled to distinguish between a control message activating SP-SCI reporting and a control message deactivating SP-SCI reporting.

26 Claims, 20 Drawing Sheets

Related U.S. Application Data

(60) Provisional application No. 62/616,823, filed on Jan. 12, 2018.

(51) Int. Cl.
*H04B 7/06* (2006.01)
*H04L 1/18* (2006.01)
*H04W 72/12* (2009.01)
*H04W 72/04* (2009.01)

(52) U.S. Cl.
CPC .......... *H04L 1/0026* (2013.01); *H04L 1/1812* (2013.01); *H04L 5/0053* (2013.01); *H04W 72/0406* (2013.01); *H04W 72/1205* (2013.01)

(56) References Cited

U.S. PATENT DOCUMENTS

| | | | | |
|---|---|---|---|---|
| 9,991,942 | B2* | 6/2018 | Onggosanusi .... | H04W 72/0406 |
| 2011/0019637 | A1* | 1/2011 | Ojala ................ | H04L 1/0026 |
| | | | | 370/329 |
| 2015/0124726 | A1* | 5/2015 | Ni ..................... | H04L 5/0048 |
| | | | | 370/329 |
| 2018/0062724 | A1* | 3/2018 | Onggosanusi ..... | H04B 7/0478 |
| 2018/0167930 | A1* | 6/2018 | Huang ............... | H04B 7/0626 |
| 2018/0287757 | A1* | 10/2018 | Onggosanusi ..... | H04L 5/0053 |
| 2019/0053084 | A1* | 2/2019 | Hosseini ........... | H04B 7/0626 |
| 2019/0053089 | A1* | 2/2019 | Kwak ................ | H04B 7/0626 |
| 2019/0058517 | A1* | 2/2019 | Kang ................. | H04B 7/06 |
| 2019/0123801 | A1* | 4/2019 | Yum .................. | H04B 7/0626 |

OTHER PUBLICATIONS

Ericsson, "R1-1711566: On semi-persistnet CSI reporting on PUSCH," 3GPP TSG-RAN WG1 #89ah-NR, Jun. 27-30, 2017, Qingdao, China, 4 pages.

Ericsson, "R1-1720734: On remaining details of CSI reporting," 3GPP TSG-RAN WG1 #91, Nov. 27-Dec. 1, 2017, Reno, USA, 11 pages.

Ericsson, "R1-1720746: On semi-persistent CSI reporting on PUSCH," 3GPP TSG-RAN WG1 #91, Nov. 27-Dec. 1, 2017, Reno, USA, 5 pages.

Ericsson, "R1-1800696: On activation and deactivation of semi-persistent CSI reporting on PUSCH," 3GPP TSG RAN WG1 Meeting AH 1801, Jan. 22-26, 2018, Vancouver, Canada, 4 pages.

International Search Report and Written Opinion for International Patent Application No. PCT/IB2019/050203, dated May 8, 2019, 16 pages.

* cited by examiner

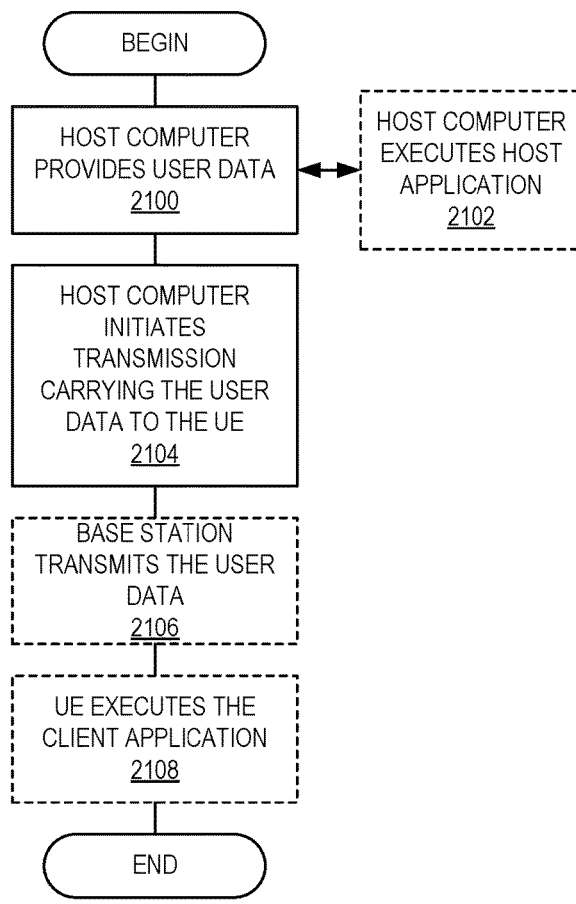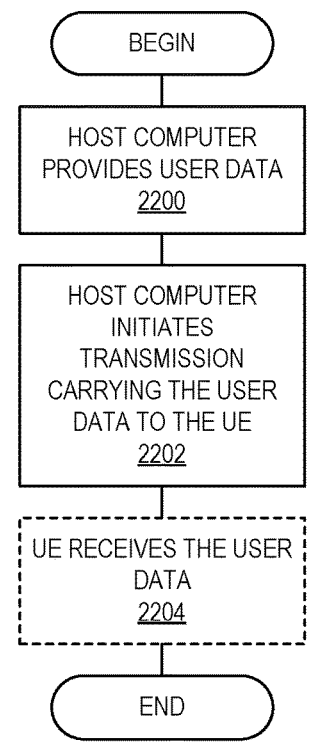
*FIG. 21*
*FIG. 22*

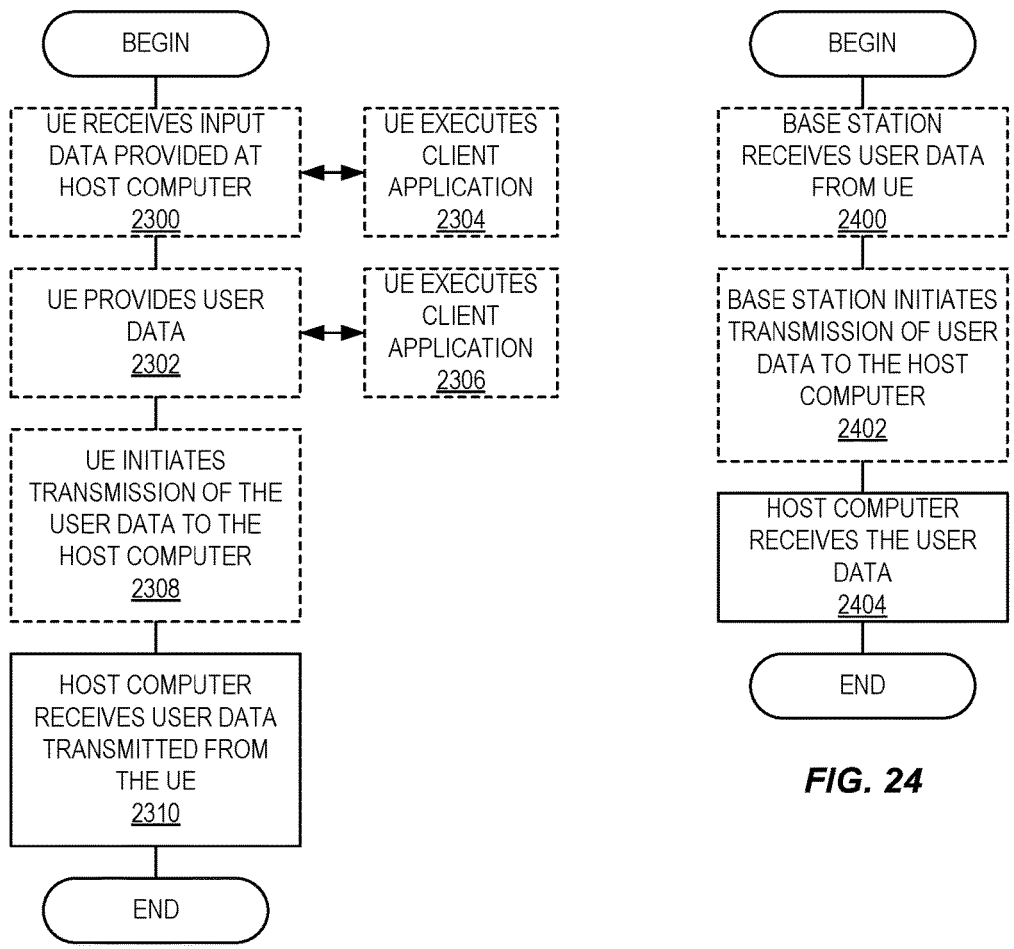

ACTIVATION AND DEACTIVATION OF SEMI-PERSISTENT CSI REPORTING

RELATED APPLICATIONS

This application is a continuation of International Patent Application Serial Number PCT/IB2019/050203, filed Jan. 10, 2019, which claims the benefit of Provisional Patent Application Ser. No. 62/616,823, filed Jan. 12, 2018, the disclosures of which are hereby incorporated herein by reference in their entireties.

TECHNICAL FIELD

The present disclosure relates to a wireless communication system and, more specifically, to activation and deactivation of semi-persistent Channel State Information (CSI) reporting by a wireless device.

BACKGROUND

The next generation mobile wireless communication system, which is referred to as Third Generation Partnership Project (3GPP) Fifth Generation (5G) or New Radio (NR), will support a diverse set of use cases and a diverse set of deployment scenarios. The latter includes deployment at both low frequencies in the range of hundreds of megahertz (MHz), similar to Long Term Evolution (LTE) today, and very high frequencies referred to as millimeter wave (mmW) in the range of tens of gigahertz (GHz).

Similar to LTE, NR will use Orthogonal Frequency Division Multiplexing (OFDM) in the downlink from a NR base station (gNB) to a User Equipment device (UE). In the uplink from the UE to the gNB, both Discrete Fourier Transform (DFT) spread OFDM and OFDM will be supported.

The basic NR physical resource can thus be seen as a time-frequency grid as illustrated in FIG. 1, where each Resource Element (RE) corresponds to one OFDM subcarrier during one OFDM symbol interval. Resource allocation in a slot is described in terms of Resource Blocks (RBs) in the frequency domain and number of OFDM symbols in the time domain. A RB corresponds to 12 contiguous subcarriers and a slot consists of 14 OFDM symbols.

Different subcarrier spacing values are supported in NR. The supported subcarrier spacing values, which are also referred to as numerologies, in NR are given by $\Delta f=(15\times 2^{\alpha})$ kHz where $\alpha$ is a non-negative integer.

In the time domain, downlink and uplink transmissions in NR are organized into equally-sized subframes similar to LTE as shown in FIG. 2. A subframe is further divided into slots and the number of slots per subframe is $2^{\alpha+1}$ for a numerology of $(15\times 2^{\alpha})$ kHz.

NR supports "slot based" transmission. In each slot, the gNB transmits Downlink Control Information (DCI) about which UE data is to be transmitted to and what resources in the current downlink subframe the data is transmitted on. The DCI is carried on the Physical Downlink Control Channel (PDCCH) and data is carried on the Physical Downlink Shared Channel (PDSCH).

This PDCCH is typically transmitted in Control Resource Sets (CORSETs) in the first few OFDM symbols in each slot. A UE first decodes PDCCH and if a PDCCH is decoded successfully, it then decodes the corresponding PDSCH based on the decoded DCI in the PDCCH.

Uplink data transmissions are also dynamically scheduled using PDCCH. Similar to downlink, a UE first decodes an uplink grant in a DCI carried by PDCCH and then transmits data over the Physical Uplink Shared Channel (PUSCH) based on the decoded control information in the uplink grant such as modulation order, coding rate, uplink resource allocation, etc. Each UE is assigned a unique Cell Radio Network Temporary Identifier (C-RNTI) during network connection. The Cyclic Redundancy Check (CRC) bits attached to a DCI for a UE are scrambled by the UE's C-RNTI, so a UE recognizes its own DCI by checking the CRC bits of the DCI against the assigned C-RNTI.

DCI Format for Scheduling PUSCH

For uplink scheduling over PUSCH, at least the following bit fields are included in an uplink DCI:
Frequency domain resource assignment
Time domain resource assignment
Modulation and Coding Scheme (MCS)—5 bits
New data indicator—1 bit
Redundancy version—2 bits
Hybrid Automatic Repeat Request (HARQ) process number—4 bits
Transmission Power Control (TPC) command for scheduled PUSCH—2 bits
Channel State Information (CSI) request—0, 1, 2, 3, 4, 5, or 6 bits determined by higher layer parameter ReportTriggerSize.

CSI Reporting

CSI feedback is used by the gNB to obtain downlink CSI from a UE in order to determine how to transmit downlink data to a UE over a plurality of antenna ports. CSI typically includes a channel Rank Indicator (RI), a Precoding Matrix Indicator (PMI), and a Channel Quality Indicator (CQI). RI is used to indicate the number of data layers that can be transmitted simultaneously to a UE, PMI is used to indicate the precoding matrix for the indicated data layers, and CQI is used to indicate the modulation and coding rate that can be achieved with the indicated rank and the precoding matrix.

In NR, in addition to periodic and aperiodic CSI reporting as in LTE, semi-persistent CSI reporting is also supported. Thus, three types of CSI reporting will be supported in NR as follows:
Periodic CSI (P-CSI) Reporting on Physical Uplink Control Channel (PUCCH): CSI is reported periodically by a UE. Parameters such as periodicity and slot offset are configured semi-statically by higher layer Radio Resource Control (RRC) signaling from the gNB to the UE.
Aperiodic CSI (A-CSI) Reporting on PUSCH: This type of CSI reporting involves a single-shot (i.e., one time) CSI report by a UE which is dynamically triggered by the gNB using DCI. Some of the parameters related to the configuration of the A-CSI report is semi-statically configured by RRC but the triggering is dynamic.
Semi-Persistent CSI (SP-CSI) Reporting on PUSCH: Similar to P-CSI reporting, SP-CSI reporting has a periodicity and slot offset which may be semi-statically configured. However, a dynamic trigger from the gNB to the UE may be needed to allow the UE to begin SP-CSI reporting. A dynamic trigger from the gNB to the UE is needed to request the UE to stop the SP-CSI reporting.

CSI Reference Signal (CSI-RS)

CSI-RS is used for measuring downlink CSI by a UE. CSI-RS is transmitted over each transmit (Tx) antenna port at the gNB and for different antenna ports and the CSI-RSs are multiplexed in time, frequency, and code domain such that the channel between each Tx antenna port at the gNB and each receive antenna port at a UE can be measured by the UE. A time frequency resource used for transmitting CSI-RS is referred to as a CSI-RS resource.

CSI Framework in NR

In NR, a UE can be configured with N≥1 CSI reporting settings (i.e., ReportConfigs), M≥1 resource settings (i.e., ResourceConfigs), and one CSI measurement setting, where the CSI measurement setting includes L≥1 measurement links (i.e., MeasLinkConfigs). At least the following configuration parameters are signaled via RRC for CSI acquisition.
1. N, M, and L are indicated either implicitly or explicitly
2. In each CSI reporting setting, at least the following are included:
   reported CSI parameter(s) such as RI, PMI, CQI
   CSI Type if reported such as Type I or Type II
   Codebook configuration including codebook subset restriction
   Time domain behavior such as P-CSI, SP-CSI, or A-CSI
   Frequency granularity for CQI and PMI such as wideband, partial band, or sub-band
   Measurement restriction configurations such as RBs in frequency domain and slots in the time domain
3. In each CSI-RS resource setting:
   A configuration of S≥1 CSI-RS resource set(s)
   A configuration of $K_s≥1$ CSI-RS resources for each resource set s, including at least: mapping to REs, the number of antenna ports, time domain behavior, etc.
   Time domain behavior: aperiodic, periodic, or semi-persistent
4. In each of the L links in CSI measurement setting:
   CSI reporting setting indication, resource setting indication, quantity to be measured (either channel or interference)
   One CSI reporting setting can be linked with one or multiple resource settings
   Multiple CSI reporting settings can be linked to one resource setting A-CSI Reporting on PUSCH A-CSI reporting over PUSCH is triggered by a DCI for scheduling PUSCH or uplink DCI. A special CSI request bit field in the DCI is defined for the purpose. Each value of the CSI request bit field defines a codepoint and each codepoint can be associated with a higher layer configured CSI report trigger state. For A-CSI reporting, the CSI report trigger states contains a list of $S_c$ measurement links associated with A-CSI reporting. Each CSI report trigger state defines at least the following information:
   Resource configurations:
      CSI-RS resource for channel measurement
      Interference measurement resource for interference measurement
   CSI report configuration:
      The type of CSI report, i.e. wideband or sub-band, Type I or Type II codebook used, etc.
The bit width, $L_c$, of the CSI request field is configurable from 0 to 6 bits. When the number of CSI triggering states, $S_c$, is larger than the number of codepoints, i.e. $S_c > 2^{L_c}-1$, a Medium Access Control (MAC) Control Element (CE) is used to select a subset of $2^{L_c}-1$ triggering states from the $S_c$ triggering states so that there is a one-to-one mapping between each codepoint and a CSI triggering state. The $2^{L_c}-1$ is due to the fact that one codepoint with setting the CSI request field to all zeroes is used to indicate no triggered report.

FIG. 3 provides an illustration of A-CSI reporting.

SP-CSI Reporting on PUSCH

FIG. 4 illustrates SP-CSI reporting over PUSCH. It has been agreed that SP-CSI reporting over PUSCH is activated using DCI, and the CSI is reported on PUSCH periodically until the SP-CSI reporting is deactivated, also by DCI, as shown in FIG. 4.

It has also been agreed that the CRC bits of the corresponding DCIs for the activation and deactivation are scrambled by a SP-CSI C-RNTI.

For semi-persistent reporting on PUSCH, a set of SP-CSI report settings, or SP-CSI report trigger states, are higher layer configured by Semi-persistent-on-PUSCHReportTrigger and the CSI request field in DCI scrambled with SP-CSI C-RNTI activates one of the SP-CSI reports or trigger states. As used herein, a SP-CSI report trigger state may comprise one or more of a SP-CSI report setting configuration, a SP-CSI resource setting configuration for channel measurement, and a SP-CSI resource setting configuration for interference measurement. When only a single SP-CSI resource is allowed, then a SP-CSI report trigger state is equivalent to one or more SP-CSI report settings.

A UE performs SP-CSI reporting on the PUSCH upon successful decoding an uplink DCI format. The uplink DCI format will contain one or more CSI Reporting Setting Indications where the associated CSI Measurement Links and CSI Resource Settings are higher layer configured. SP-CSI reporting on the PUSCH supports Type I and Type II CSI with wideband, partial band, and sub-band frequency granularities. The PUSCH resources and MCS are allocated semi-persistently by an uplink DCI.

The gNB or UE consists of a number protocol layers, including Physical (PHY) layer, MAC layer, and RRC layer. The PHY layer is also referred to as Layer 1 (L1). The MAC layer is part of Layer 2 (L2), which also includes Radio Link Control (RLC), Packet Data Convergence Protocol (PDCP), and Service Data Adaptation Protocol (SDAP) layers. Layers above PHY are also referred to as higher layers, such as MAC and RRC. Part of the MAC function is to perform data scheduling while part of the RRC function is to establish, maintain, and release radio link connection between a gNB and a UE.

Semi-Persistent Uplink Transmission without a Grant (UL-TWG)

In addition to dynamic allocation of resources to a UE via PDCCH, the gNB can also semi-statically allocate resources for Configured Scheduling (CS) or Semi-Persistent Scheduling (SPS):
   Type 1: with uplink Type 1 CS resources, RRC defines the grant and no PDCCH is needed.
   Type 2: with uplink Type 2 CS resources, RRC defines the periodicity of the CS grant and PDCCH addressed to CS-RNTI activates the CS resources, i.e., it indicates that the downlink grant is a CS one and that it can be implicitly reused according to the periodicity defined by RRC, until deactivated.

Type 1 and Type 2 are configured by RRC per serving cell. For the same serving cell, either Type 1 or Type 2 is configured to a UE. On each serving cell, there can be only one CS configuration active at a time. Retransmissions other than repetitions are explicitly allocated via PDCCH(s).

RRC configures at least the following parameters when the configured grant Type 1 is configured:
cs-RNTI: CS-RNTI for retransmission;
periodicity: periodicity of the configured grant Type 1;
timeDomainOffset: Offset of a resource with respect to System Frame Number (SFN)=0 in time domain;
numberOfConfGrant-Processes: the number of HARQ processes;
frequencyDomainResource: frequency domain resource allocation in terms of RBs;
TimeDomanResource: time domain resource allocation in terms OFDM symbols;
MCS_index: MCS index; and
DMRS_ports: Demodulation Reference Signal (DMRS) ports allocation.

RRC configures at least the following parameters when the configured grant Type 2 is configured:
cs-RNTI: CS Radio Network Temporary Identifier (RNTI) for activation, deactivation, and retransmission;
periodicity: periodicity of the configured grant Type 2; and
numberOfConfGrant-Processes: the number of HARQ processes.

The UE does not transmit anything on the resources configured by the RRC if the higher layers did not deliver a Transport Block (TB) to transmit on the resources allocated for SPS transmission.

A set of allowed periodicities P are defined in table 6.1.2.3-1 of 38.214, which is copied below, where CP is for Cyclic Prefix type.

TABLE 6.1.2.3-1

Allowed periodicities P for uplink transmission without grant

| $\mu$ | CP | Possible values of periodicities P [symbols] |
|---|---|---|
| 0 | Normal | 2, 7, n * 14, where n = {1, 2, 5, 10, 20, 32, 40, 64, 80, 128, 160, 320, 640} |
| 1 | Normal | 2, 7, n * 14, where n = {1, 2, 4, 10, 20, 40, 64, 80, 128, 160, 256, 320, 640, 1280} |
| 2 | Normal | 2, 7, n * 14, where n = {1, 2, 4, 8, 20, 40, 80, 128, 160, 256, 320, 512, 640, 1280, 2560} |
| 2 | Extended | 2, 6, n * 12, where n = {1, 2, 4, 8, 20, 40, 80, 128, 160, 256, 320, 512, 640, 1280, 2560} |
| 3 | Normal | 2, 7, n * 14, where n = {1, 2, 4, 8, 16, 40, 80, 160, 256, 320, 512, 640, 1024, 1280, 2560, 5120} |

SUMMARY

Systems and methods for validating a control message for activation or deactivation of Semi-Persistent Channel State Information (SP-CSI) reporting in a wireless communication system are disclosed. In some embodiments, a method performed by a wireless device for validating a control message for activation or deactivation of SP-CSI reporting in a wireless communication system comprises receiving a control message for activation or deactivation of the SP-CSI reporting. The method further comprises making, based on the control message, a determination as to whether to activate the SP-CSI reporting or to deactivate the SP-CSI reporting and activating or deactivating the SP-CSI reporting in accordance with the determination. In this manner, the wireless device is enabled to distinguish between a control message activating SP-SCI reporting and a control message deactivating SP-SCI reporting.

In some embodiments, the control message comprises Downlink Control Information (DCI) carried on a Physical Downlink Control Channel (PDCCH). In some embodiments, the control message is scrambled with an identifier of the wireless device that is associated with SP-CSI reporting. In some embodiments, the identifier of the wireless device that is associated with SP-CSI reporting is a SP-CSI Cell Radio Network Temporary Identifier (SP-CSI-RNTI) of the wireless device.

In some embodiments, the control message comprises information that indicates whether the control message is for activation of the SP-CSI reporting or for deactivation of the SP-CSI reporting, and making the determination comprises making the determination as to whether to activate or deactivate the SP-CSI reporting based on the information comprised in the control message. Further, in some embodiments, the information comprises bit values configured in one or more bit fields of the control message, wherein the one or more bit fields of the control message are defined for other purposes but are reused, when the control message is scrambled with a SP-CSI cell radio network temporary identifier, to provide an indication as to whether to activate the SP-CSI reporting or to deactivate the SP-CSI reporting. Further, in some embodiments, the one or more bit fields comprise one or more bit fields defined for the purpose of providing a new data indicator and/or a redundancy version. In some embodiments, when activating the SP-CSI reporting, the one or more bit fields for activating the SP-CSI comprise one or more of: a field defined for the purpose of communicating a New Data Indicator, a field defined for the purpose of communicating a Redundancy Version, a field defined for the purpose of communicating a Transmission Power Control (TPC) command for a Physical Uplink Shared Channel (PUSCH), and/or a field defined for the purpose of communicating a Hybrid Automatic Repeat Request (HARQ) process number. In some embodiments, when activating the SP-CSI reporting, the control message for activating the SP-CSI is validated if the bits in the one or more bit field are set to all zeros. In some embodiments, when deactivating the SP-CSI reporting, the one or more bit fields for deactivating the SP-SCI reporting comprise one or more of: a field defined for the purpose of communicating a New Data Indicator, a field defined for the purpose of communicating a Redundancy Version, a field defined for the purpose of communicating a TPC command for a PUSCH, a field defined for the purpose of communicating a HARQ process number, a field defined for the purpose of communicating a Modulation and Coding Scheme (MCS), a field defined for the purpose of communicating a frequency domain resource assignment, and/or a field defined for the purpose of communicating a time domain resource assignment. In some embodiments, when deactivating the SP-CSI reporting, the one or more fields for deactivating the SP-CSI reporting, the control message for deactivating the SP-CSI is validated if the bits in one or more of the bit fields for the purpose of communicating a MCS, for the purpose of communicating a frequency domain resource assignment, and for the purpose of communicating a time domain resource assignment are all set to ones, and the bits in one or more bit fields for the purpose of communicating a New Data Indicator, for the purpose of communicating a Redundancy Version, for the purpose of communicating a transmission power control command for a physical uplink shared channel, and for the purpose of communicating a HARQ process number are all set to zeros.

Embodiments of a wireless device are also disclosed. In some embodiments, a wireless device for validating a control message for activation or deactivation of SP-CSI reporting in a wireless communication system comprises one or more transmitters, one or more receivers, and processing circuitry associated with the one or more transmitters and the one or more receivers. The processing circuitry is configured to cause the wireless device to receive a control message for activation or deactivation of the SP-CSI reporting. The processing circuitry is further configured to cause the wireless device to make, based on the control message, a determination as to whether to activate the SP-CSI reporting or to deactivate the SP-CSI reporting and activate or deactivate the SP-CSI reporting in accordance with the determination.

Embodiments of a method performed by a base station are also disclosed. In some embodiments, a method performed by a base station for enabling activation or deactivation of SP-CSI reporting in a wireless communication system comprises sending, to a wireless device, a control message for activation or deactivation of SP-CSI reporting.

In some embodiments, the control message comprises DCI carried on a PDCCH. In some embodiments, the control message is scrambled with an identifier of the wireless device that is associated with SP-CSI reporting. In some embodiments, the identifier of the wireless device that is associated with SP-CSI reporting is a SP-CSI C-RNTI of the wireless device.

In some embodiments, the control message comprises information that indicates whether the control message is for activation of the SP-CSI reporting or for deactivation of the SP-CSI reporting. Further, in some embodiments, the information comprises bit values configured in one or more bit fields of the control message, wherein the one or more bit fields of the control message are defined for other purposes but are reused, when the control message is scrambled with a SP-CSI cell radio network temporary identifier, to provide an indication as to whether to activate the SP-CSI reporting or to deactivate the SP-CSI reporting. Further, in some embodiments, the one or more bit fields comprise one or more bit fields defined for the purpose of providing a new data indicator and/or a redundancy version. In some embodiments, when activating the SP-CSI reporting, the one or more bit fields for activating the SP-CSI comprise one or more of: a field defined for the purpose of communicating a New Data Indicator, a field defined for the purpose of communicating a Redundancy Version, a field defined for the purpose of communicating a transmission power control command for a physical uplink shared channel, and/or a field defined for the purpose of communicating a Hybrid Automatic Repeat Request (HARQ) process number. In some embodiments, when activating the SP-CSI reporting, the control message for activating the SP-CSI is validated if the bits in the one or more bit field are set to all zeros. In some embodiments, when deactivating the SP-CSI reporting, the one or more bit fields for deactivating the SP-SCI reporting comprise one or more of: a field defined for the purpose of communicating a New Data Indicator, a field defined for the purpose of communicating a Redundancy Version, a field defined for the purpose of communicating a TPC command for a PUSCH, a field defined for the purpose of communicating a HARQ process number; a field defined for the purpose of communicating a MCS; a field defined for the purpose of communicating a frequency domain resource assignment; and/or a field defined for the purpose of communicating a time domain resource assignment. In some embodiments, when deactivating the SP-CSI reporting, the one or more fields for deactivating the SP-CSI reporting, the control message for deactivating the SP-CSI is validated if the bits in one or more of the bit fields for the purpose of communicating a MCS, for the purpose of communicating a frequency domain resource assignment, and for the purpose of communicating a time domain resource assignment are all set to ones, and the bits in one or more bit fields for the purpose of communicating a New Data Indicator, for the purpose of communicating a Redundancy Version, for the purpose of communicating a transmission power control command for a physical uplink shared channel, and for the purpose of communicating a HARQ process number are all set to zeros.

Embodiments of a base station are also disclosed. In some embodiments, a base station for enabling activation or deactivation of the SP-CSI reporting in a wireless communication system comprises processing circuitry configured to cause the base station to send, to a wireless device, a control message for activation or deactivation of SP-CSI reporting.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 21 through 24 are flow charts that illustrate various embodiments of methods implemented in a communication system such as that of FIGS. 19 and 20.

DETAILED DESCRIPTION

Figure 1:
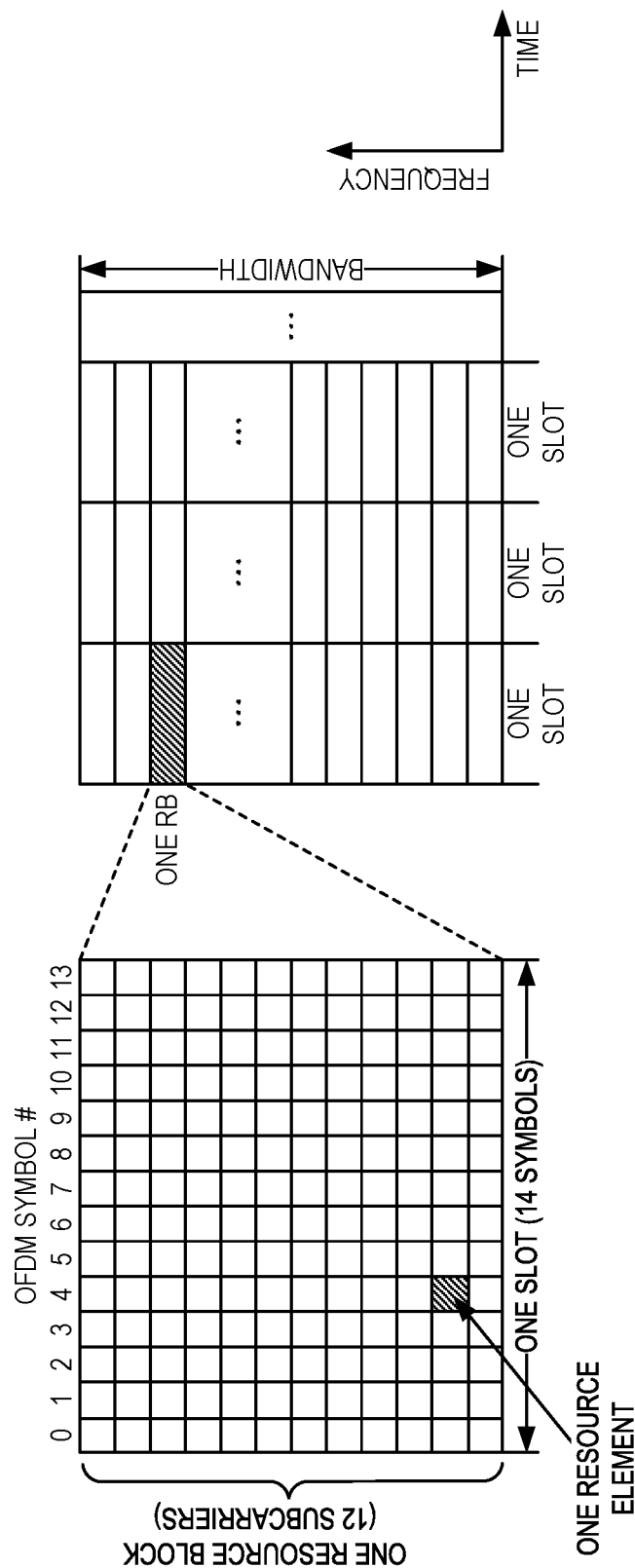
FIG. 1 illustrates an example of Third Generation Partnership Project (3GPP) New Radio (NR) physical resources.
Figure 2:
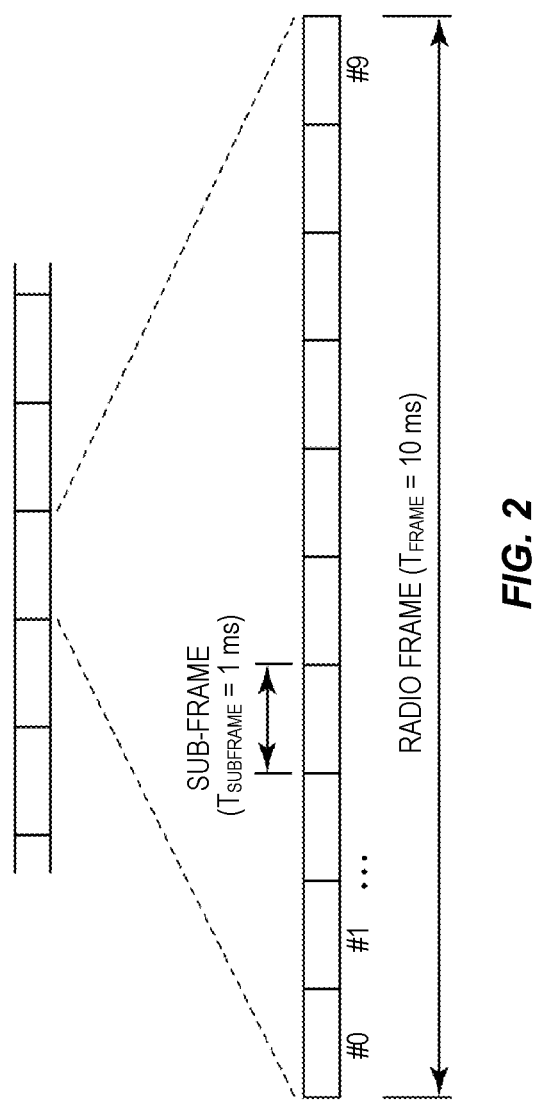
FIG. 2 illustrates the NR time domain structure with 15 kilohertz (kHz) subcarrier spacing.
Figure 3:
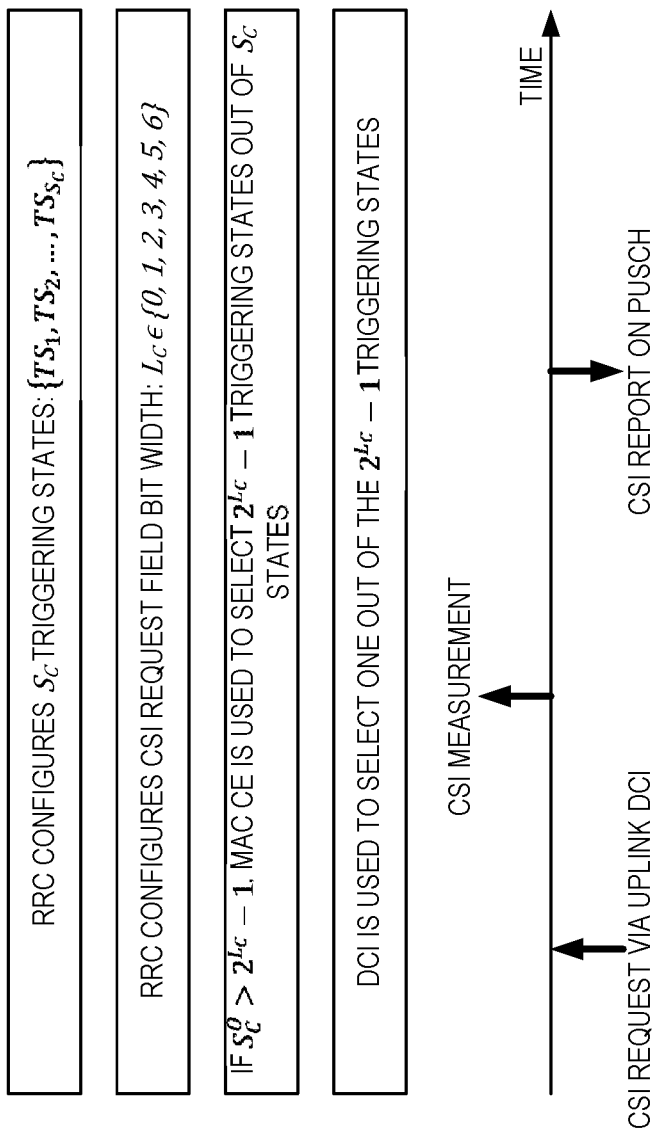
FIG. 3 is an illustration of Aperiodic Channel State Information (A-CSI) reporting.
Figure 4:
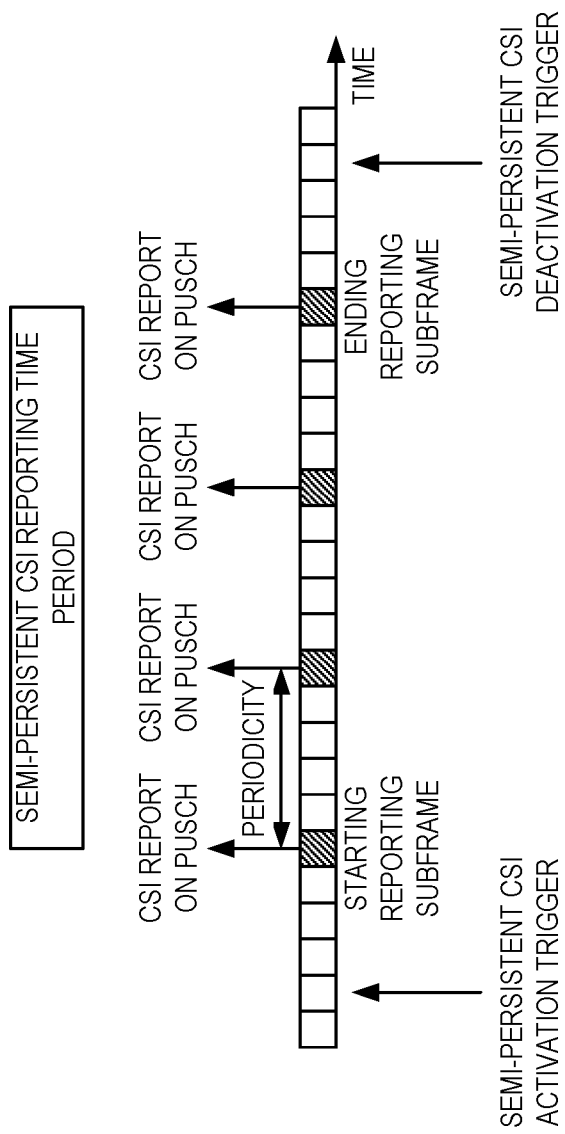
FIG. 4 is an illustration of Semi-Persistent CSI (SP-CSI) reporting.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). Although a UE can recognize Downlink Control Information (DCI) (also referred to herein as a DCI message) for Semi-Persistent Channel State Information (SP-CSI) if the DCI is scrambled by SP-CSI Cell Radio Network Temporary Identifier (C-RNTI), how to distinguish between SP-CSI activation and deactivation (or release) remains a problem. The same also exists for uplink Semi-Persistent Scheduling (SPS).

Certain aspects of the present disclosure and their embodiments may provide solutions to the aforementioned or other challenges. The following options are proposed:

Option 1: toggling between SP-CSI activation and deactivation

Option 2: Reusing some DCI bit field for the purpose

Option 3: Reuse more than one bit field in uplink DCI for activation and deactivation indication Option 4: Use one bit in Channel State Information (CSI) request field for activation/deactivation and the remaining bits for selecting SP-CSI trigger state Option 5: Define activation/deactivation as part of the SP-CSI triggering states Option 6: Joint activation/deactivation of uplink grant free data transmission and SP-CSI Certain embodiments may provide one or more of the following technical advantage(s). The solutions allow a UE to distinguish between an activation DCI and a deactivation DCI for SP-CSI reporting.

Figure 5:
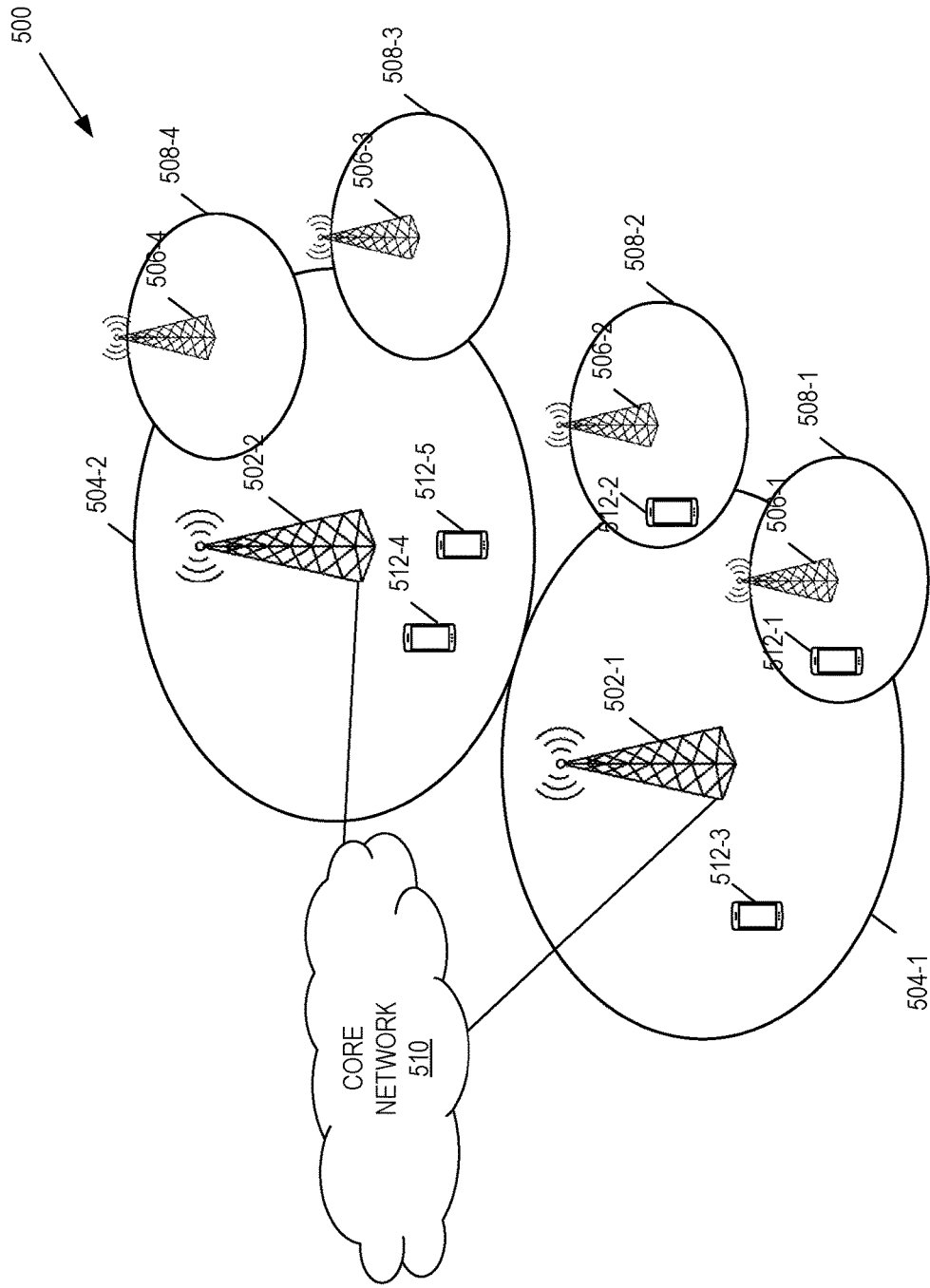
FIG. 5 illustrates an example of a wireless communication system in which embodiments of the present disclosure may be implemented.

FIG. 5 illustrates one example of a cellular communications network 500 according to some embodiments of the present disclosure. In the embodiments described herein, the cellular communications network 500 is a 5G NR network. In this example, the cellular communications network 500 includes base stations 502-1 and 502-2, which in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell

508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Figure 6:
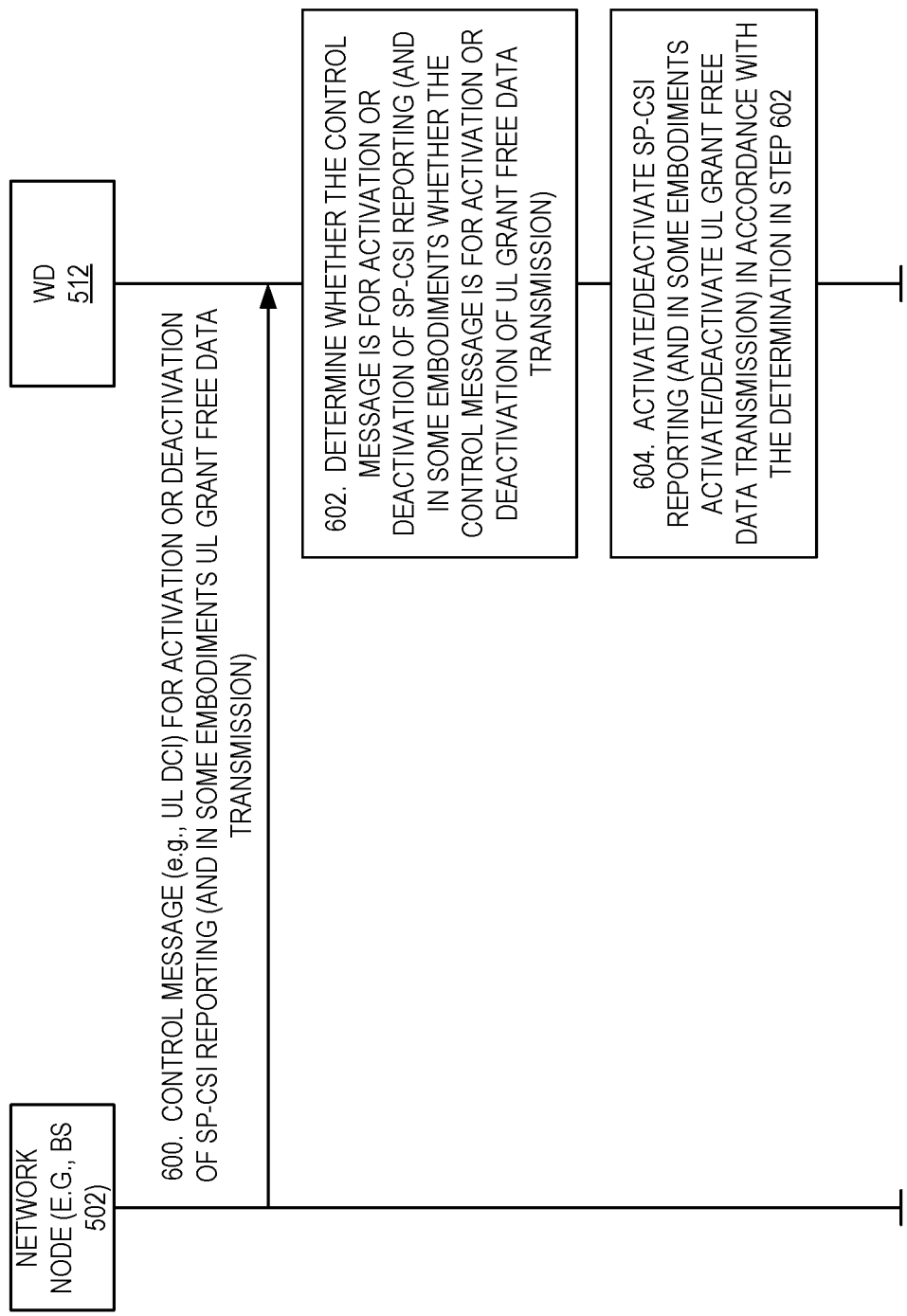
FIG. 6 illustrates one example of the operation of a network node (e.g., a base station) and a wireless device (e.g., a User Equipment device (UE)) to provide activation/deactivation of SP-CSI reporting in accordance with some embodiments of the present disclosure.

Various embodiments for activation and deactivation of SP-CSI reporting on Physical Uplink Shared Channel (PUSCH) are described below. In this regard, FIG. 6 illustrates one example of the operation of a network node (e.g., a base station 502) and a wireless device 512 to provide activation/deactivation of SP-CSI reporting in accordance with some embodiments of the present disclosure. As illustrated, the network node sends, to the wireless device 512, a control message (e.g., an Uplink (UL) DCI which is also referred to herein as an UL DCI message) for activation or deactivation of SP-SCI reporting (step 600). In some embodiments, the control message is also for uplink grant free data transmission, as described below in detail.

As will be described below, there are various embodiments of the present disclosure. In some embodiments, the control message is an UL DCI message that is scrambled with an identifier of the wireless device 512 (e.g., a SP-CSI C-RNTI of the wireless device 512), where the wireless device 512 is to toggle between activation and deactivation of SP-CSI reporting upon receiving the UL DCI message that is scrambled with its SP-CSI C-RNTI. In some other embodiments, the control message is an UL DCI message that is scrambled with an identifier of the wireless device 512 (e.g., a SP-CSI C-RNTI of the wireless device 512) and includes information that indicates whether the control message is for activation of SP-CSI reporting or deactivation of SP-CSI reporting. As described below in detail, in some embodiments, this information may be one or more bits in one or more fields that are defined for other purposes and reused to provide an indication of whether the message is for activation or deactivation of SP-CSI reporting, as described in more detail below. In some other embodiments, this information is one or more bits of a CSI Request Field included in the UL DCI message. Still further, in some embodiments, this information is indicated by a SP-CSI trigger state indicated by the UL DCI message, where separate SP-CSI trigger states are defined for activation of SP-CSI reporting and deactivation of SP-CSI reporting. Lastly, in some other embodiments, information included in the UL DCI message and a current state of the wireless device 512 are both taken into account to determine whether to activate or deactivate SP-CSI reporting and, at least in some embodiments, whether to activate or deactivate uplink grant free transmission at the wireless device 512.

Upon receiving the control message, the wireless device 512 determines whether the control message is for activation of SP-CSI reporting or for deactivation of SP-CSI reporting (step 602). In some embodiments, the wireless device 512 also determines whether the message is for activation of uplink grant free data transmission or for deactivation of uplink grant free data transmission. In some embodiments, this process includes determining that the control message is scrambled with the identity (e.g., SP-CSI C-RNTI) of the wireless device 512 and, if so, proceeding to determine whether to activate or deactivate SP-CSI reporting based on the message in accordance with any of the embodiments described herein. The wireless device 512 then activates or deactivates SP-CSI reporting in accordance with the determination made in step 602 (step 604).

A number of more detailed embodiments will now be described. Note that these embodiments may be used alone or in any desired combination.

Embodiment 1: Toggling SP-CSI Activation and Deactivation

Figure 7:
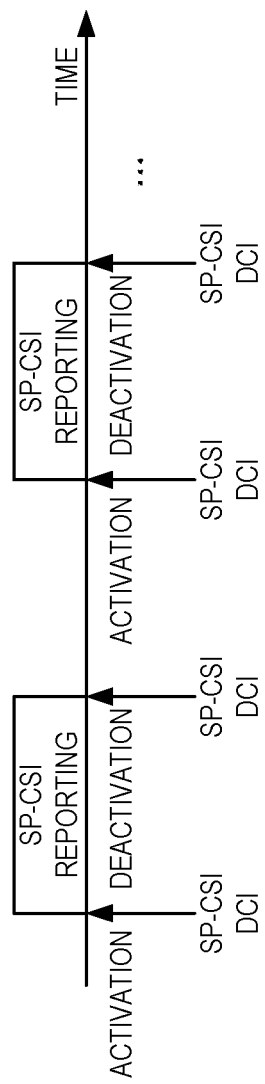
FIG. 7 illustrates an example of toggling between activation and deactivation in accordance with some embodiments of the present disclosure in accordance with a first embodiment of the present disclosure.

One way for SP-CSI activation and deactivation indication is to toggle between activation and deactivation (or release). In this approach, the first transmitted UL DCI scrambled with SP-CSI C-RNTI is for SP-CSI activation. The second SP-CSI DCI following the first SP-CSI DCI is for deactivation (or release) of the SP-CSI activated by the first SP-CSI DCI. The third SP-CSI DCI following the second SP-CSI is for activation of a new SP-CSI, and the fourth SP-CSI DCI following the third SP-CSI DCI is for deactivation of the SP-CSI activated by the third SP-CSI DCI, and so on. An example is shown in FIG. 7.

The drawback of this toggling approach is that it may prevent reconfiguration of an on-going SP-CSI reporting on PUSCH. For example, the gNB may want to change the resource allocation or modulation order for an ongoing SP-CSI; this cannot be done with the toggling approach as a UE could treat a reconfiguration SP-CSI DCI as for deactivation. In addition, if a UE missed a SP-CSI DCI due to, for example, decoding error, then the subsequent SP-CSI reporting would be wrong.

In one variant of this embodiment, if the second SP-CSI DCI which follows the first SP-CSI DCI that activated a SP-CSI reporting on PUSCH contains the same bit field values as the first SP-CSI, then the UE can assume that the second SP-CSI DCI has deactivated the SP-CSI reporting on PUSCH. For instance, if the modulation order or resource allocation indicated by the first and second SP-CSI DCIs is the same, then the UE can assume that the second SP-CSI DCI has deactivated the SP-CSI reporting on PUSCH. However, if one or more bit field values between the first and second SP-CSI DCIs are different, then the UE can assume that the second SP-CSI DCI has reconfigured the SP-CSI reporting on PUSCH. For example, if the modulation order or resource allocation indicated by the first and second SP-CSI DCIs is different, then the UE can assume that the second SP-CSI DCI has reconfigured the SP-CSI reporting on PUSCH.

Figure 8:
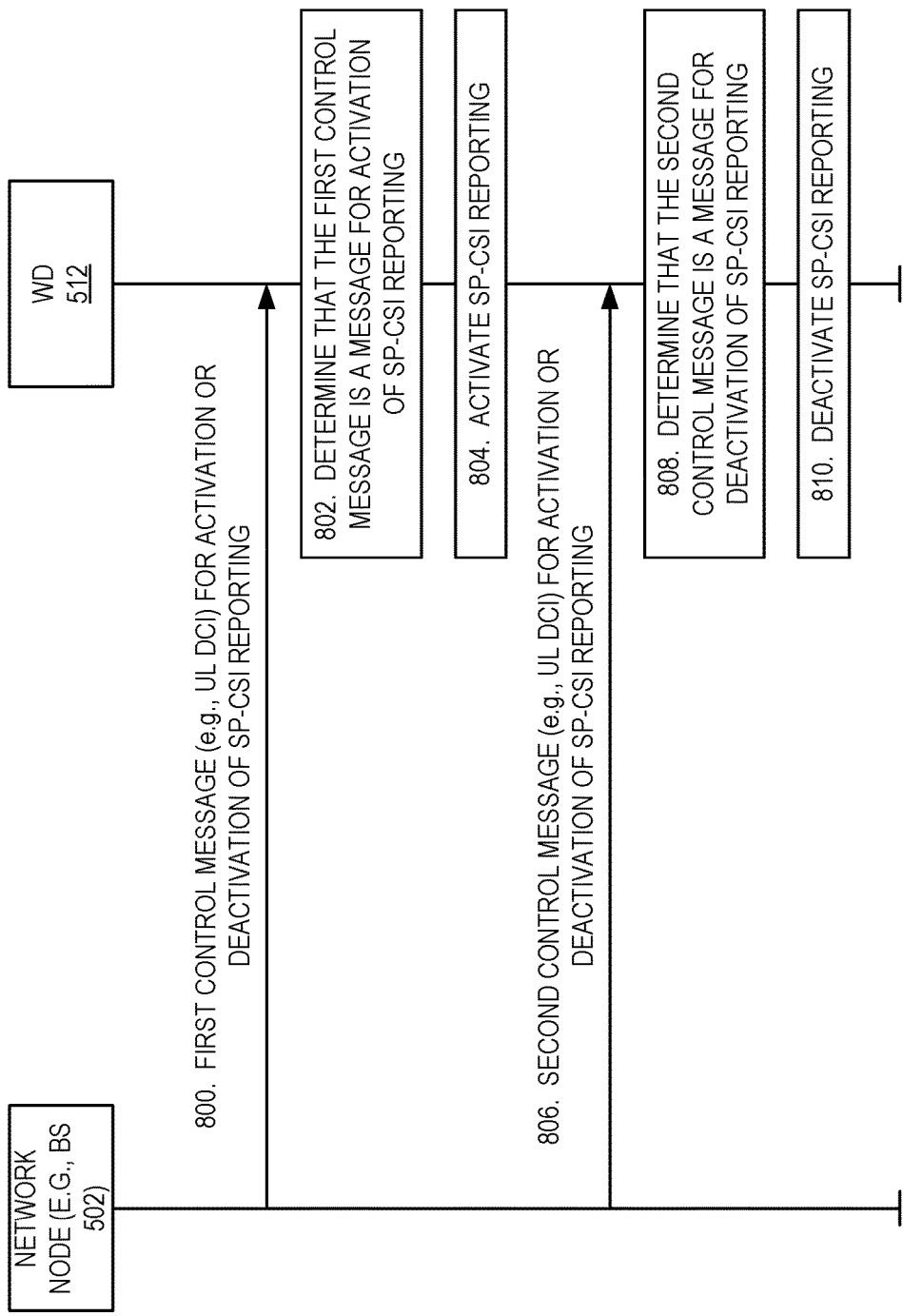
FIG. 8 illustrates one example of the operation of a network node (e.g., a base station) and a wireless device (e.g., a UE) in accordance with the first embodiment of the present disclosure.

FIG. 8 illustrates one example of the operation of a network node (e.g., the base station 502) and the wireless device 512 in accordance with Embodiment 1. As illustrated, the network node sends, to the wireless device 512, a first control message (e.g., a first UL DCI message that is scrambled with the identity (e.g., SP-CSI C-RNTI) of the wireless device 512) for activation/deactivation of SP-CSI reporting (step 800). Upon receiving the first control message, the wireless device 512 determines that the control message is for activation of SP-CSI reporting since the control message is the first control message received by the wireless device 512 for activation or deactivation of SP-CSI reporting (step 802). As such, the wireless device 512 activates SP-CSI reporting (step 804).

Sometime thereafter, the network node sends a second control message (e.g., a second UL DCI message that is scrambled with the identity (e.g., SP-CSI C-RNTI) of the wireless device 512) for activation/deactivation of SP-CSI reporting (step 806). Upon receiving the second control message, the wireless device 512 determines that the control message is for deactivation of SP-CSI reporting since the control message is the second control message received by the wireless device 512 for activation or deactivation of SP-CSI reporting (step 808). As such, the wireless device 512 deactivates SP-CSI reporting (step 810). The process can continue in this manner. In this way, the wireless device 512 toggles between activation and deactivation of SP-CSI reporting upon receiving the control messages.

Notably, in some embodiments, the determination to deactivate SP-CSI reporting in step 808 further includes a determination whether the values in one or more predefined fields in the second control message are the same as the values for the same field(s) in the first control message. If so, the wireless device 512 determines that SP-CSI reporting is to be deactivated. If not, the wireless device 512 determines that SP-CSI reporting is to remain activated.

Embodiments 2-5: UL DCI Containing Information that Indicates Whether the Message is for Activation or Deactivation of SP-CSI Reporting Embodiment 2—Reuse Some Bit Field in UL DCI for Activation and Deactivation Indication For uplink data transmission on PUSCH, when a decoding error occurs at the gNB, the gNB may request a retransmission of the data by a UE. For this purpose, the UE keeps a copy of the original data in its transmission buffer until a DCI with a New Data Indication (NDI) is received from the gNB for the same Hybrid Automatic Repeat Request (HARQ) process. When a retransmission is needed, the gNB typically sends another uplink grant in DCI with the "New Data Indication" bit set to "0" and the "Redundancy Version" bit field set to a desired value.

For SP-CSI reporting on PUSCH, when a decoding error occurs, a retransmission is not necessary because either a retransmitted SP-CSI can be aged or a SP-CSI update is not possible as a UE needs to keep an old copy of the CSI even though a new CSI measurement is available between the first transmission and the retransmission. In the latter case, it would be better to report the new updated CSI instead of retransmitting the old CSI. Without retransmission, the "New Data Indication" field and the "Redundancy Version" field in the uplink DCI are redundant for SP-CSI activation and deactivation. Therefore, they can be used for SP-CSI activation and deactivation indication.

Figure 9:
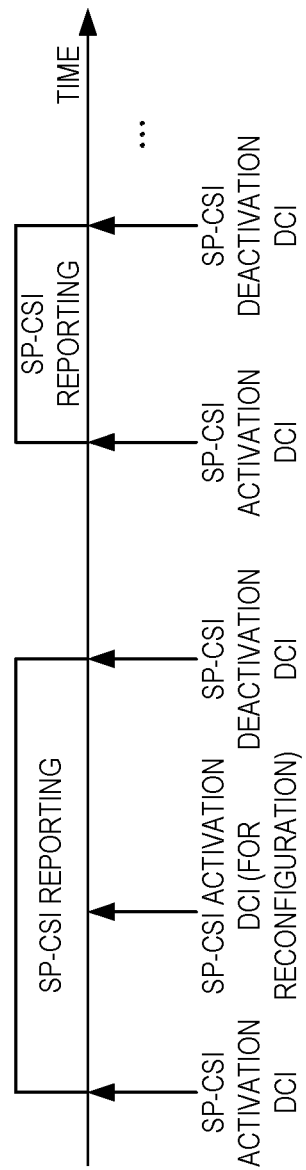
FIG. 9 illustrates an example of reusing an existing New Data Indication (NDI) bit field for SP-CSI activation and deactivation to support SP-CSI reconfiguration in accordance with a second embodiment of the present disclosure.

In one embodiment, the "New Data Indication" bit may be used for SP-CSI activation and deactivation indication. After a UE detects an UL DCI scrambled by its SP-CSI C-RNTI, the UE can further check the "New Data Indication" bit to determine whether it is for SP-CSI activation or deactivation. For example, the bit is set to "0" for activation and to "1" for deactivation. This allows for reconfiguration of an ongoing SP-CSI by sending a new activation DCI with new parameters such as a new resource allocation or a new modulation order. An example is shown in FIG. 9.

Alternatively, the 2 bit "Redundancy Version" field in the UL DCI can be used for the purpose. For example, the bits are set to "00" for activation and to "11" for deactivation.

Embodiment 3—Reuse More than One Bit Field in UL DCI for Activation and Deactivation Indication To further enhance the validation reliability for SP-CSI activation or deactivation, more than one bit field in UL DCI may be used.

For SP-CSI activation validation, a UE first validates a SP-CSI DCI in a Physical Downlink Control Channel (PD-CCH) by verifying that the Cyclic Redundancy Check (CRC) bits of the DCI are scrambled by SP-CSI C-RNTI. As an example, the UE further verifies that at least one or all of the following conditions are met:
 "New Data Indicator" bit is set to "0"
 "Redundancy Version" bits are set to all "0"
 "Transmission Power Control (TPC) Command for scheduled PUSCH" bits are set to all "0"
 "HARQ process number" bits are set to all "0"

For SP-CSI deactivation or release validation, a UE first validates a SP-CSI DCI in a PDCCH by verifying that the CRC bits of the DCI are scrambled by SP-CSI C-RNTI. As an example, the UE further verifies that at least one or all of the following conditions are met:
 "New Data Indicator" bit is set to "0"
 "Redundancy Version" bits are set to all "0"
 "TPC Command for scheduled PUSCH" bits are set to all "0"
 "HARQ process number" bits are set to all "0"
 "Modulation and coding scheme and redundancy version" bits are set to all "1"s
 "Frequency domain resource assignment" bits are set to all "1"s
 "Time domain resource assignment" bits are set to all "1"s Embodiment 4—Use One Bit in the CSI Request Field in UL DCI for Activation and Deactivation Indication Another option is to use one bit in the CSI request bit field for activation and deactivation indication and the rest of the bits in the CSI request field for selecting a SP-CSI trigger state. However, when the configured number of bits in the CSI request field is small, this would reduce the number of SP-CSI trigger states that can be supported. Furthermore, if only one bit for the CSI request field is configured, then this option would not allow more than one SP-CSI trigger state, which is a limitation. This option Doesn't Work when the Zero Bit is Configured for the CSI Request Field.

Figure 10:
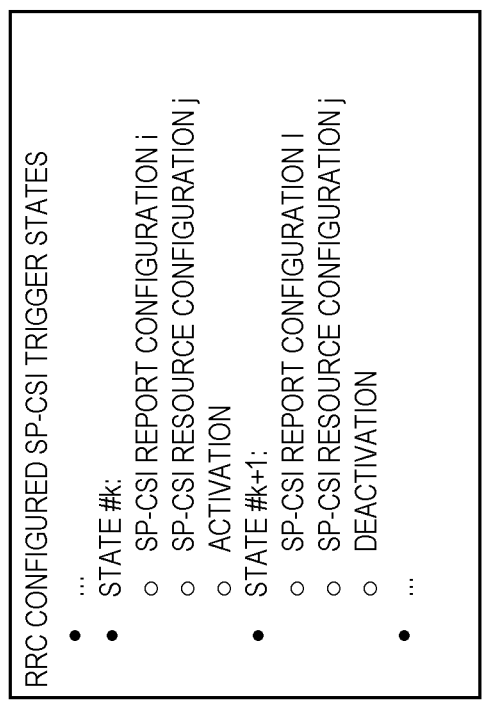
FIG. 10 illustrates an example of defining SP-CSI activation and deactivation as separate SP-CSI trigger states in accordance with another embodiment of the present disclosure.

Embodiment 5—Define Activation/Deactivation as Part of the SP-CSI Trigger States Indication Another option is to include SP-CSI activation and deactivation as part of the SP-CSI trigger states, in which case for each SP-CSI reporting configuration and resource configuration, two states are configured—one for activation and the other for deactivation, as shown in FIG. 10. The codepoint of the CSI request field is used to indicate a joint SP-CSI reporting configuration, resource configuration, and SP-CSI activation or deactivation. Using FIG. 10 as an example, when SP-CSI state #k is indicated by the CSI request field in DCI, it is for SP-CSI activation. Otherwise, if SP-CSI state #k+1 is indicated by the CSI request field in DCI, it is for SP-CSI deactivation.

In yet another embodiment, there is a limitation of supporting only one SP-CSI report active at the same time. Only one codepoint of the CSI request field needs to be reserved for deactivation, for instance CSI request="0".

Figure 11:
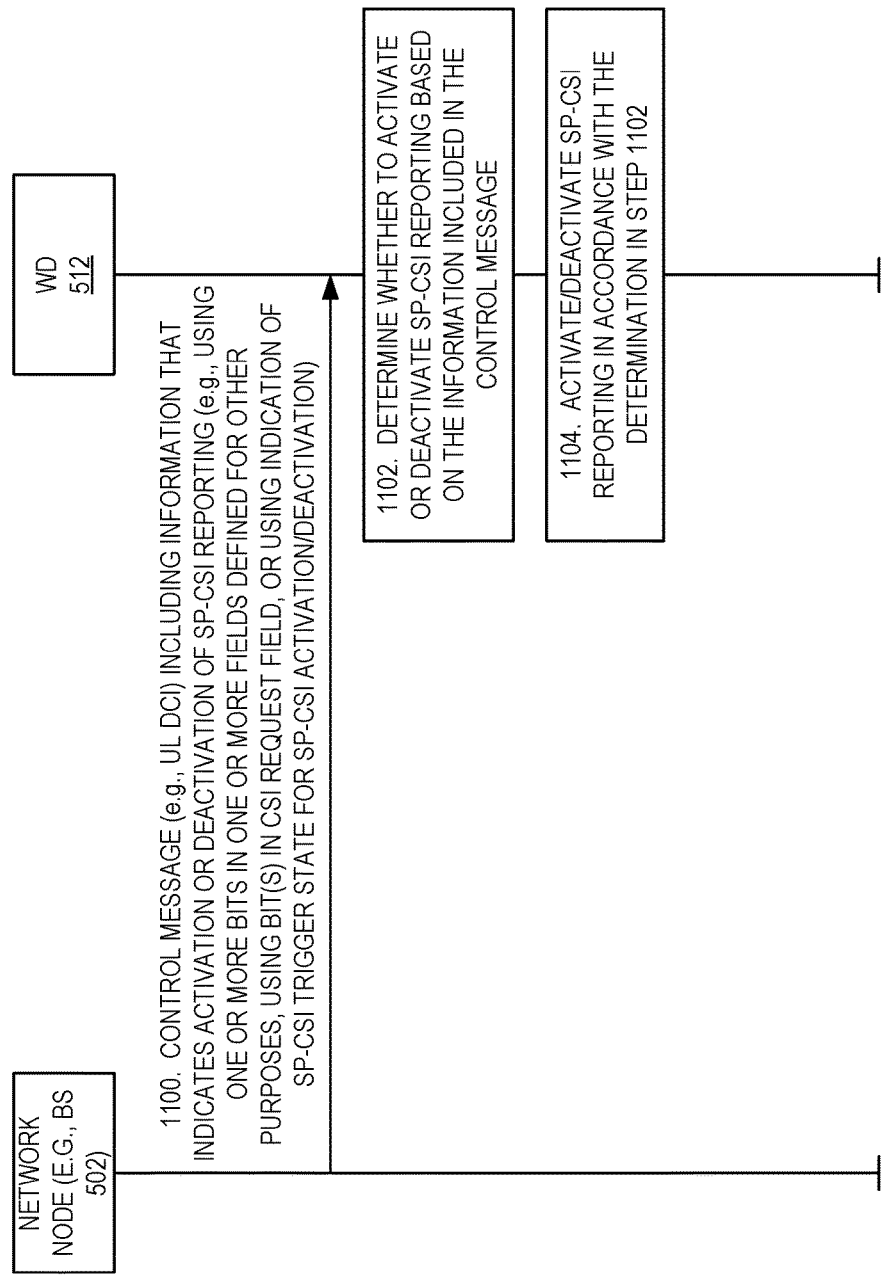
FIG. 11 illustrates one example of the operation of a network node (e.g., a base station) and a wireless device (e.g., a UE) in accordance with any one of various other embodiments of the present disclosure.

FIG. 11 illustrates one example of the operation of a network node (e.g., the base station 502) and the wireless device 512 in accordance with any one of Embodiments 2-5. As illustrated, the network node sends, to the wireless device 512, a control message (e.g., a UL DCI message that is scrambled with the identity (e.g., SP-CSI C-RNTI) of the wireless device 512) that includes information that indicates activation of SP-CSI reporting or indicates deactivation of SP-CSI reporting (step 1100). In regard to Embodiment 2, the information included in the control message is one or more bits in a field that are reused for purposes of indicating activation or deactivation of SP-CSI reporting. In Embodiment 3, this information includes bits in multiple fields of the control message. In Embodiment 4, this information includes a bit(s) in the CSI Request Field in the DCI that indicates whether the message is for activation or for deactivation of SP-CSI reporting. In Embodiment 5, this information includes information that indicates the SP-CSI trigger state, where different SP-CSI trigger states are predefined or preconfigured for activation and deactivation of SP-CSI reporting.

Upon receiving the control message, the wireless device 512 determines whether the control message is for activation of SP-CSI reporting or deactivation of SP-CSI reporting based on the information included in the control message (step 1102). More specifically, using an UL DCI message as an example, the wireless device 512 determines that the UL DCI message is scrambled with the SP-CSI C-RNTI of the wireless device 512. By determining that the UL DCI message is scrambled with the SP-CSI C-RNTI of the wireless device 512, the wireless device 512 can validate that the control message is intended for the wireless device 512 and that the control message is either for activation or for deactivation of SP-CSI. The wireless device 512 then determines whether the UL DCI message is for activation or for deactivation of SP-CSI reporting based on the information included in the UL DCI message, as described above with respect to any one of Embodiments 2-5.

The wireless device 512 activates or deactivates SP-CSI reporting in accordance with the determination made in step 1102 (step 1104).

Embodiment 6: Joint Activation/Deactivation of Uplink Grant Free Data Transmission and SP-CSI In this set of embodiments, the assumption is that only a single semi-persistent uplink grant can be active at the time. This uplink grant allows the UE to convey Uplink Shared Channel (UL-SCH) on the PUSCH using uplink grant free transmission (i.e., SPS) and may optionally allow transmission of a SP-CSI report. If SPS is activated, UL-SCH may always be mapped to the PUSCH from a Medium Access Control (MAC) perspective. However, since Uplink Control Information (UCI) (which comprises the CSI report) is supposed be multiplexed with the transport blocks provided by UL-SCH on L1 by mapping UCI to the allocated resource first, it may be possible to convey only SP-CSI reports on PUSCH if the resource allocation for the PUSCH is set appropriately by the gNB so that only the content of the CSI reports fits in the PUSCH payload.

In some embodiments, SPS and SP-CSI reporting are activated with the same UL DCI message. Said UL DCI message may be differentiated from dynamic uplink grants due to CRC being scrambled with a certain Radio Network Temporary Identifier (RNTI), such as a configured Configured Scheduling (CS) RNTI. The activation DCI may be additionally identified by the setting of a combination of certain bit fields in the DCI. In one embodiment, the bit fields set according to:
"New Data Indicator" bit is set to "0"
"Redundancy Version" bits are set to all "0"
"TPC Command for scheduled PUSCH" bits are set to all "0"
"HARQ process number" bits are set to all "0"

identify the activation DCI message. Upon reception of the activation DCI, the UE commences SPS transmission conveying at least UL-SCH on the uplink. The activation DCI additionally comprises a CSI request field. If the CSI request field is set to "0", no SP-CSI reporting is activated. It is possible, though, that the activation DCI is received by a UE which already transmits SPS and SP-CSI reporting for a certain SP CSI report setting. If the activation DCI with the CSI request field set to "0" is received by the UE in this "state," the SP-CSI reporting is deactivated (but transmission of UL-SCH is still active). It is assumed here that only one SP-CSI report setting may be activated at the time. Similarly, if a UE is in a "state" where SP-CSI reporting of Report Setting #X is activated and it receives an activation DCI with the CSI request field indicating activation of Report Setting #Y, SP-CSI reporting of Report Setting #X is deactivated and SP-CSI reporting on Report Setting #Y is activated. That is, the active SP-CSI reporting is switched, which may be seen as a state transition. If the UE receives an activation DCI activating an already activated SP-CSI report, it remains in this state and continues to report the active report setting. Such an activation DCI may for instance update the PUSCH frequency domain resource allocation or change the Modulation and Coding Scheme (MCS) so that the SP-CSI report may be conveyed in a more optimal fashion.

If both the SPS transmission and the SP-CSI transmission should be deactivated, the gNB may in some embodiments send a deactivation DCI message (which may also be CRC scrambled with a CS-RNTI). Upon reception of the deactivation DCI, the semi-persistent PUSCH transmission is stopped, implying that both SPS and any active SP-CSI reporting is deactivated. Thus, in some embodiments, the CSI request field may be ignored in the deactivation DCI, and any SP-CSI report that is active is deactivated anyway regardless of if the CSI request field is equal to "0" or not. In other embodiments, the format of the deactivation DCI asserts that the CSI request field is set to "0" in order to further provide DCI detection reliability for the deactivation DCI. The deactivation DCI may be identified by setting a certain combination of bit fields to certain values. For instance, in one embodiment, the bit fields set according to:
"New Data Indicator" bit is set to "0"
"Redundancy Version" bits are set to all "0"
"TPC Command for scheduled PUSCH" bits are set to all "0"
"HARQ process number" bits are set to all "0"s
"Modulation and coding scheme and redundancy version" bits are set to all "1"s
"Frequency domain resource assignment" bits are set to all "1"s
"Time domain resource assignment" bits are set to all "1"s
identify a deactivation DCI. Thus, the reception of a deactivation DCI can be seen as moving the UE to a "state" where both SPS and SP-CSI reporting is deactivated regardless of which "state" the UE previously was in.

Figure 12:
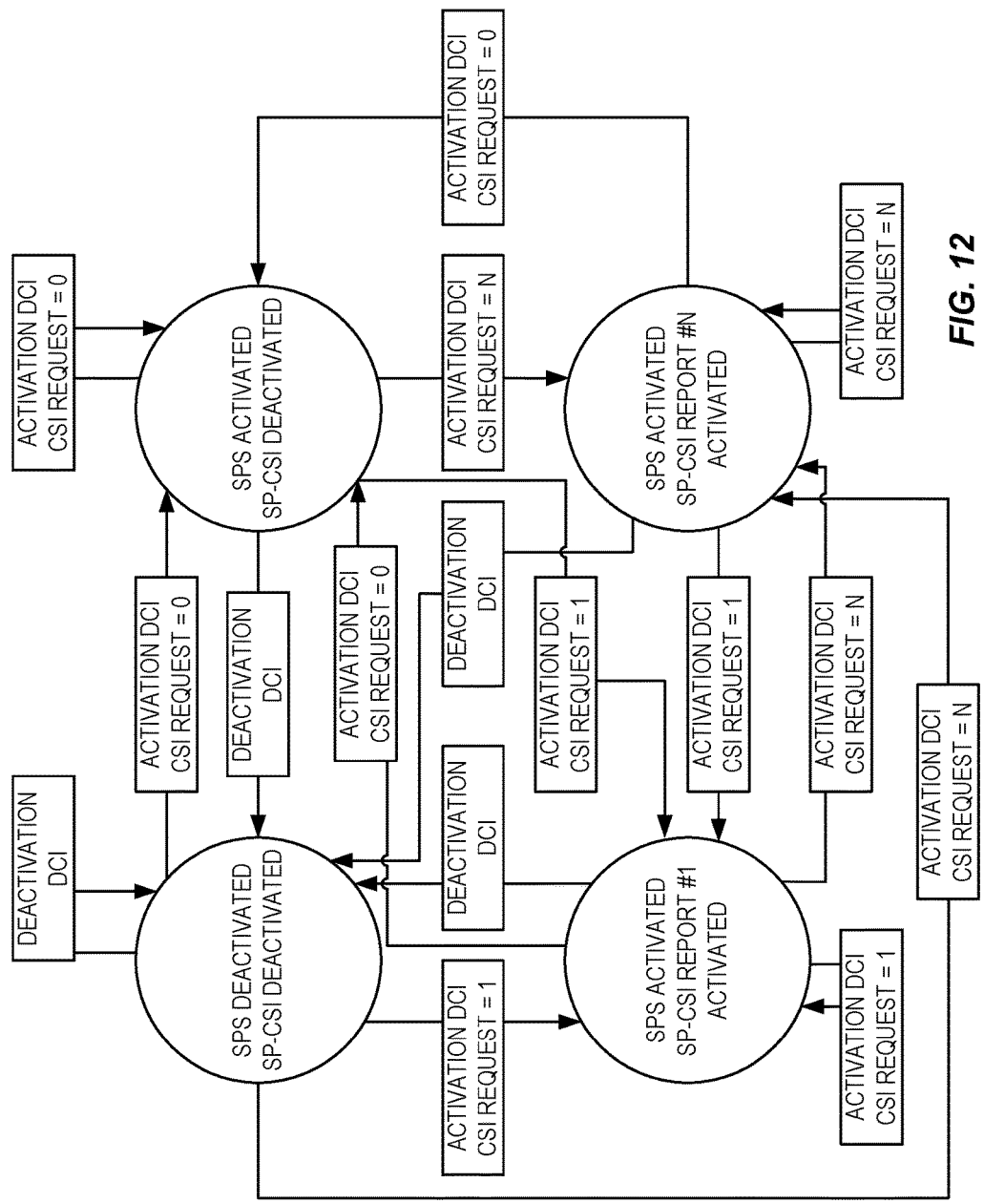
FIG. 12 is a diagram of state transitions depending on received Downlink Control Information (DCI) message in one example of another embodiment of the present disclosure.

In FIG. 12, one example of Embodiment 6 is illustrated with a state transition diagram, identifying to which state the UE moves upon reception of the different DCI messages. In general, any number of SP-CSI report settings may be supported and each activated SP-CSI report corresponds to a state, but only two states (#1 and #N) for activated SP-CSI reports is shown in FIG. 12, for readability, but it is implied that from the illustration that omitted SP-CSI report states #2, #3, . . . , #N−1 are present as well.

Note that SP-CSI reporting may not be activated without SPS also being activated in these embodiments.

In a variation of this embodiment, the "states" refer to Radio Resource Control (RRC) configured SP-CSI trigger states. A DCI may simultaneously activate one or more SP-CSI report settings, such that the one or more SP-CSI reports are transmitted on the same PUSCH. When an activation DCI message is received, the UE stops SP-CSI reporting on the SP-CSI reports associated with the previously active SP-CSI trigger state and commences SP-CSI reporting on the SP-CSI report settings associated with the SP-CSI trigger state identified with the CSI request field in the activation DCI message.

Figure 13:
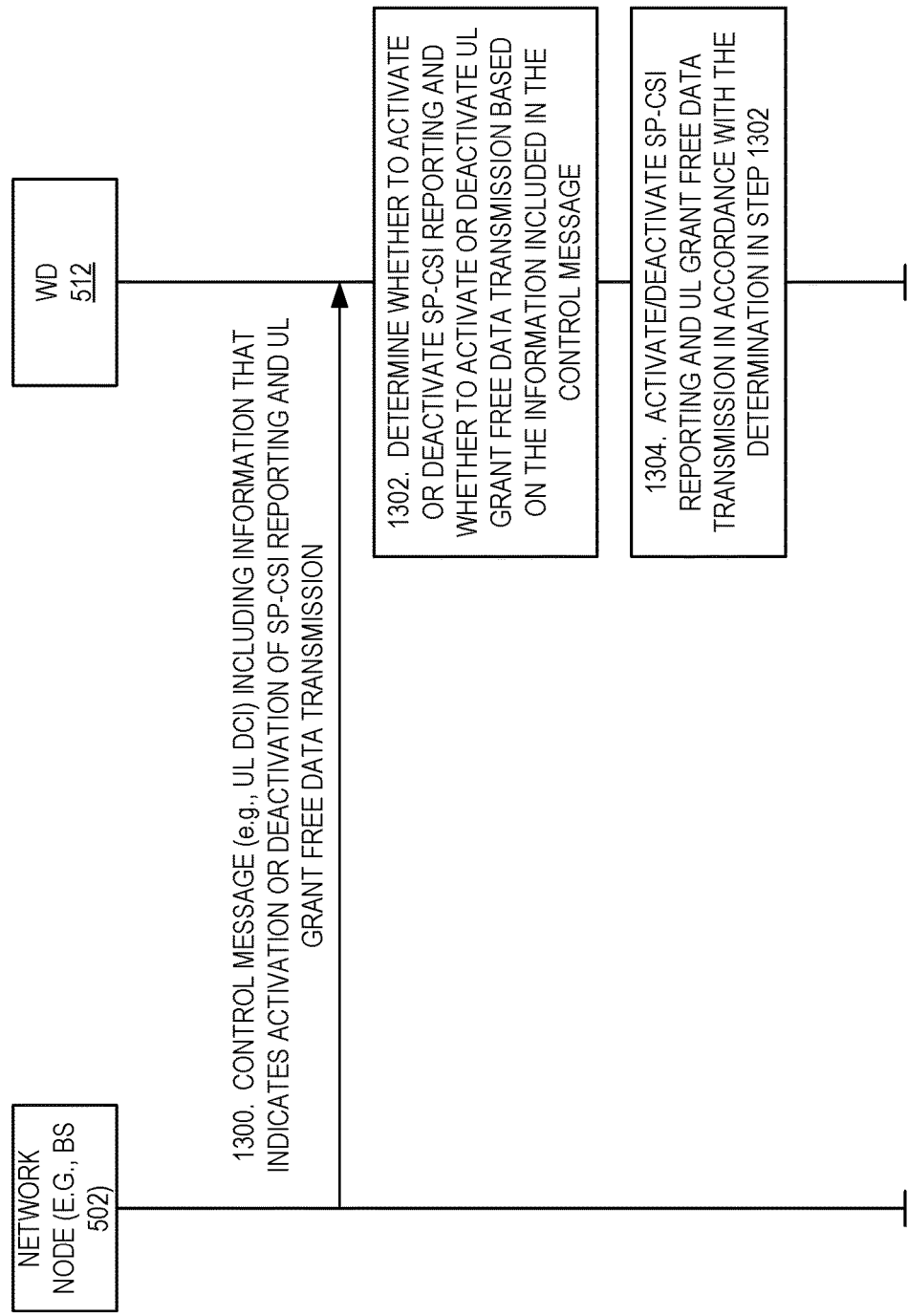
FIG. 13 illustrates one example of the operation of a network node (e.g., a base station) and a wireless device (e.g., a UE) in accordance with another embodiment of the present disclosure.

FIG. 13 illustrates one example of the operation of a network node (e.g., the base station 502) and the wireless device 512 in accordance with Embodiment 6. As illustrated, the network node sends, to the wireless device 512, a control message (e.g., a UL DCI message that is scrambled with the identity (e.g., CS-CSI C-RNTI) of the wireless device 512) that includes information that indicates activation or deactivation of SP-CSI reporting and activation or deactivation of uplink grant free data transmission (e.g., SPS data transmission) (step 1300). Upon receiving the control message, the wireless device 512 determines whether the control message is for activation of SP-CSI reporting or deactivation of SP-CSI reporting as well as for activation of uplink grant free data transmission or deactivation of uplink grant free data transmission based on the information included in the control message and a current state of the wireless device 512 (step 1302), as described above. The wireless device 512 activates or deactivates SP-CSI reporting in accordance with the determination made in step 1302 (step 1304).

Additional Information

Figure 14:
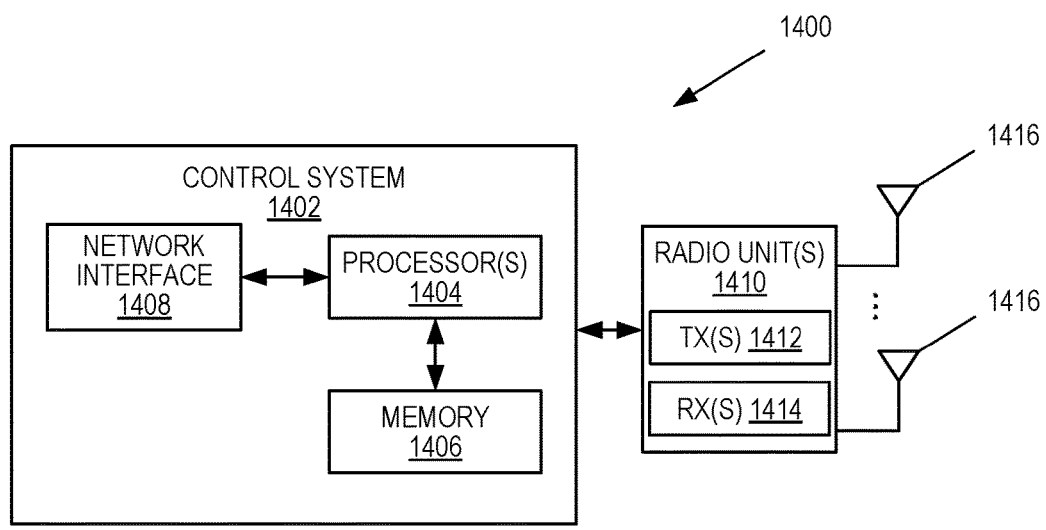
FIGS. 14 through 16 illustrate example embodiments of a radio access node or base station.

FIG. 14 is a schematic block diagram of a radio access node 1400 according to some embodiments of the present disclosure. The radio access node 1400 may be, for example, a base station 502 or 506. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. In addition, the radio access node 1400 includes one or more radio units 1410 that each includes one or more transmitters 1412 and one or more receivers 1414 coupled to one or more antennas 1416. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
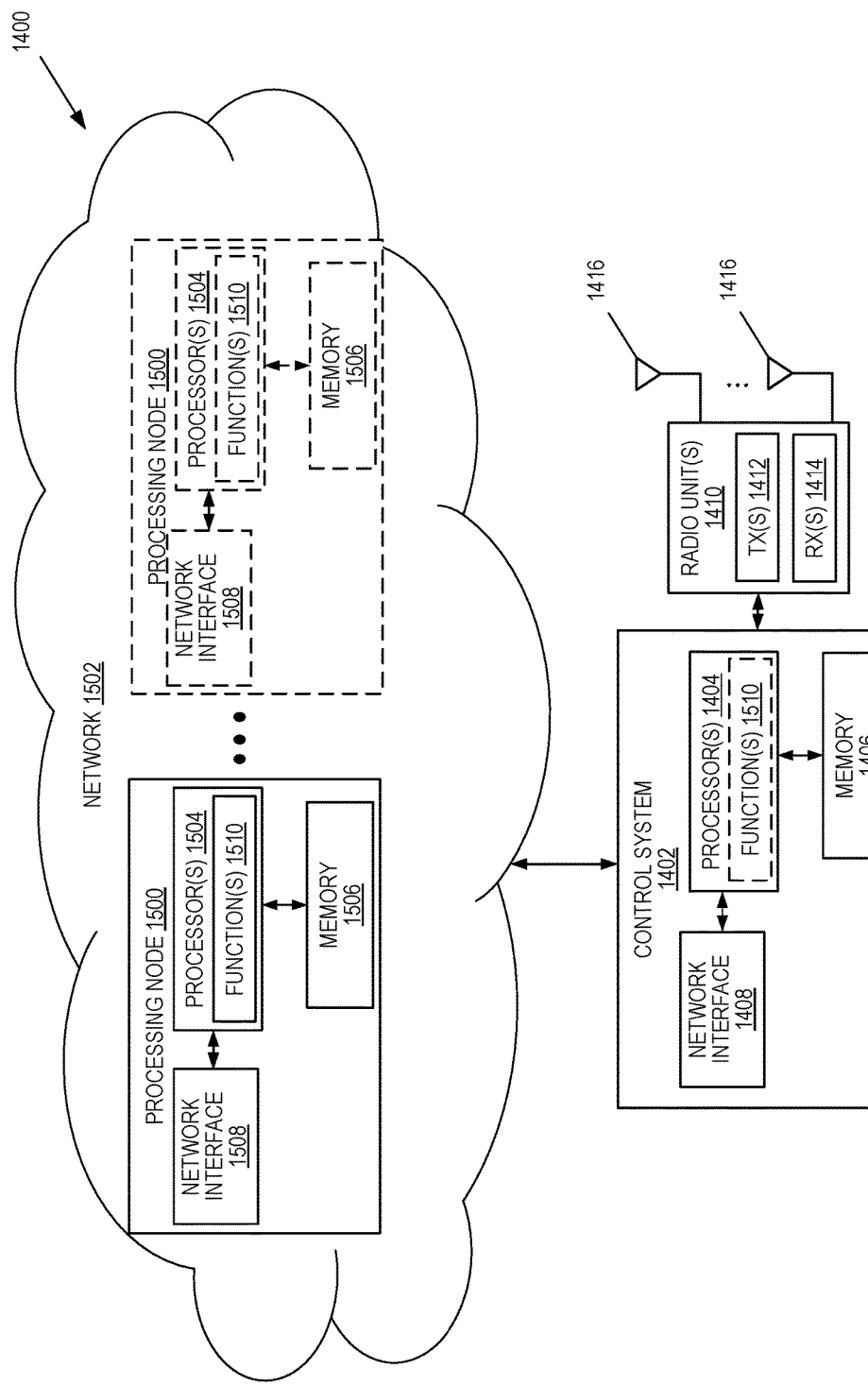

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 includes the control system 1402 that includes the one or more processors 1404 (e.g., CPUs, ASICs, FPGAs, and/or the like), the memory 1406, and the network interface 1408 and the one or more radio units 1410 that each includes the one or more transmitters 1412 and the one or more receivers 1414 coupled to the one or more antennas 1416, as described above. The control system 1402 is connected to the radio unit(s) 1410 via, for example, an optical cable or the like. The control system 1402 is connected to one or more processing nodes 1500 coupled to or included as part of a network(s) 1502 via the network interface 1408. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the control system 1402 and the one or more processing nodes 1500 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
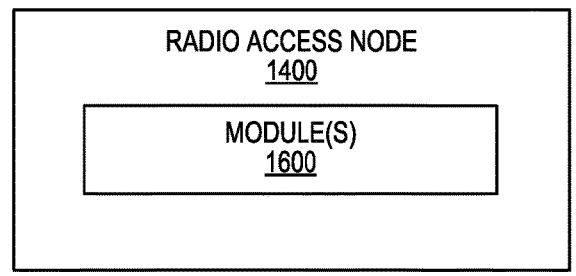

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
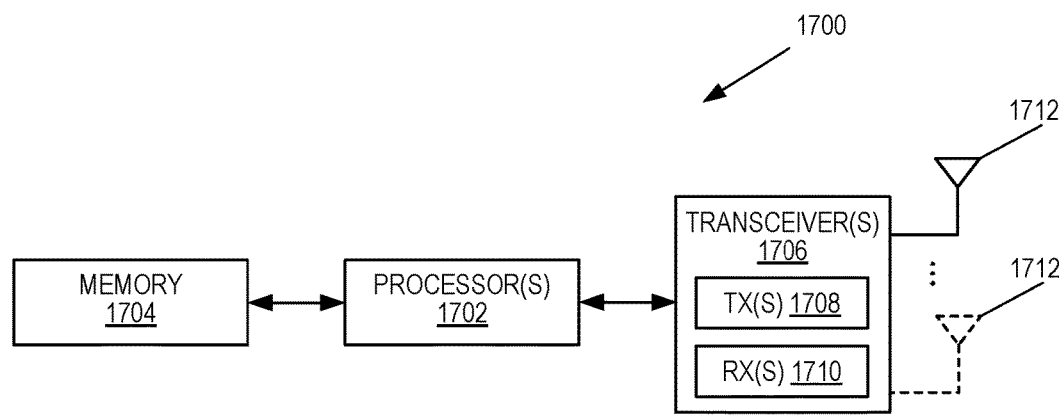
FIGS. 17 and 18 illustrate example embodiments of a wireless device or UE.

FIG. 17 is a schematic block diagram of a UE 1700 according to some embodiments of the present disclosure. As illustrated, the UE 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. In some embodiments, the functionality of the UE 1700 described above may be fully or partially implemented in software that is, e.g., stored in the memory 1704 and executed by the processor(s) 1702.

In some embodiments, a computer program including instructions which, when executed by at least one processor, causes the at least one processor to carry out the functionality of the UE 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
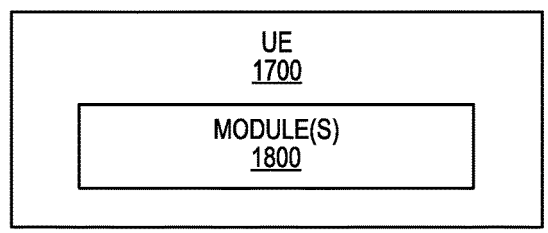

FIG. 18 is a schematic block diagram of the UE 1700 according to some other embodiments of the present disclosure. The UE 1700 includes one or more modules 1800, each of which is implemented in software. The module(s) 1800 provide the functionality of the UE 1700 described herein.

Figure 19:
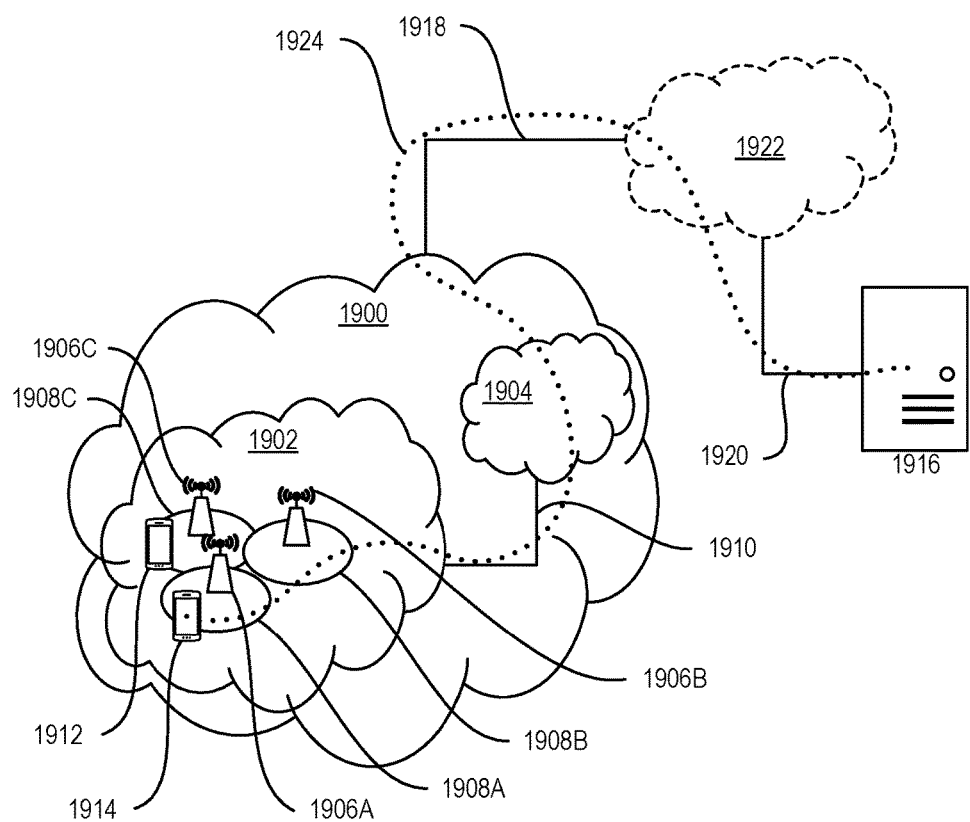
FIG. 19 illustrates one example of a communication system in which embodiments of the present disclosure may be implemented.

With reference to FIG. 19, in accordance with an embodiment, a communication system includes a telecommunication network 1900, such as a 3GPP-type cellular network, which comprises an access network 1902, such as a Radio Access Network (RAN), and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
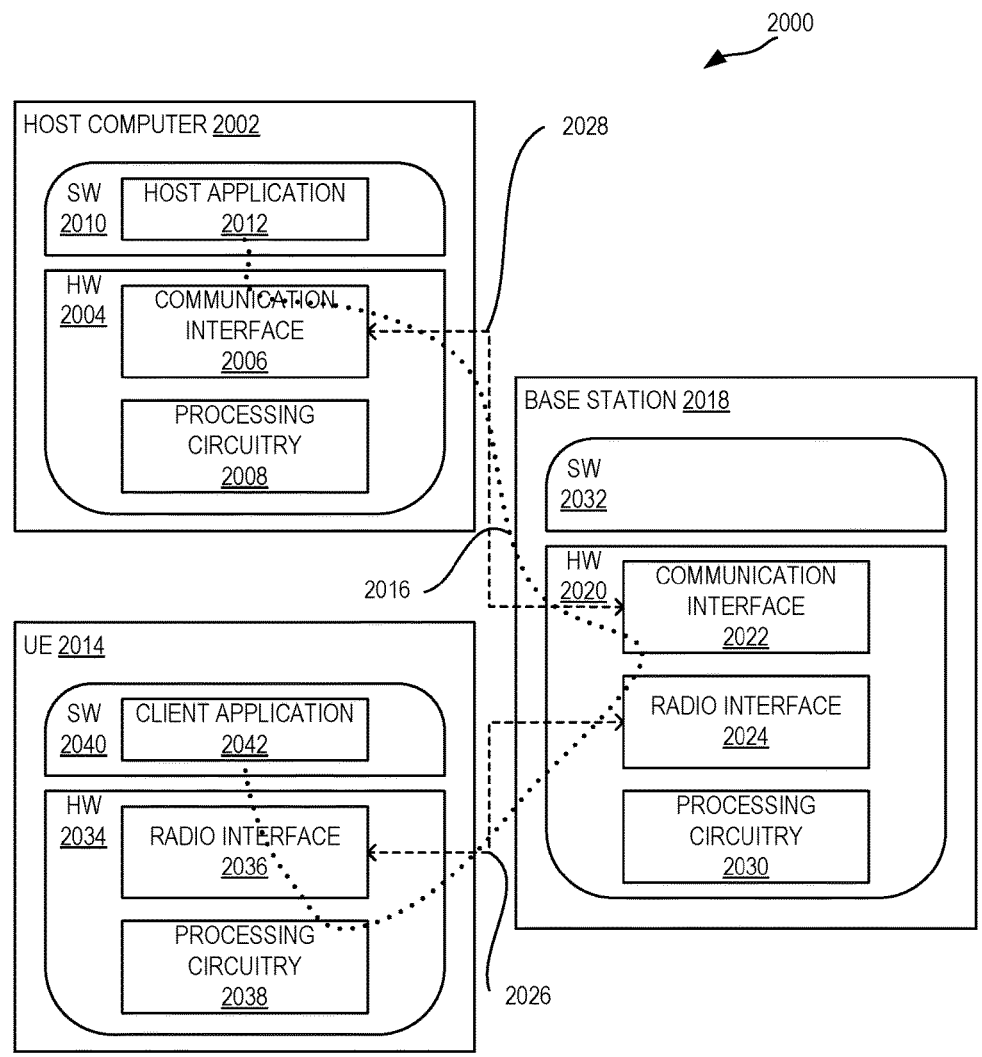
FIG. 20 is a more detailed illustration of a host computer, base station, and a UE in accordance with some embodiments of the present disclosure.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve the, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2014, and it may be unknown or imperceptible to the base station 2014. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are as follows:

Group A Embodiments

Embodiment 1

A method performed by a wireless device (512) for validating a control message for activation or deactivation of Semi-Persistent Channel State Information, SP-CSI, reporting in a wireless communication system, the method comprising at least one of: receiving (600), from a network node (502), the control message for activation or deactivation of the SP-CSI reporting; making (602), based on the control message, a determination as to whether to activate the SP-CSI reporting or to deactivate the SP-CSI reporting; and activating or deactivating (604) the SP-CSI reporting in accordance with the determination.

Embodiment 2

The method of embodiment 1 wherein the control message is a downlink control information message.

Embodiment 3

The method of embodiment 1 or 2 wherein the control message is scrambled with an identity of the wireless device (512).

Embodiment 4

The method of embodiment 1 or 2 wherein the control message is scrambled with an identity of the wireless device (512) that is associated with the SP-CSI reporting.

Embodiment 5

The method of embodiment 1 or 2 wherein the control message is scrambled with a SP-CSI cell radio network temporary identifier of the wireless device (512).

Embodiment 6

The method of any one of embodiments 1 to 5 wherein making (602) the determination as to whether to activate or deactivate the SP-CSI reporting comprises making a determination to toggle activation/deactivation of the SP-CSI reporting upon receiving the control message.

Embodiment 7

The method of any one of embodiments 1 to 5 wherein the control message is a first control message received by the wireless device (512) for activation or deactivation of the SP-CSI reporting, and making (602) the determination comprises making (802) the determination to activate the SP-CSI reporting since the control message is the first control message received by the wireless device (512) for activation or deactivation of the SP-CSI reporting.

Embodiment 8

The method of embodiment 7 further comprising at least one of: receiving (806), from the network node (502), a second control message for activation or deactivation of the SP-CSI reporting; making (808) a determination to deactivate the SP-CSI reporting upon receiving the second control message for activation or deactivation of the SP-CSI reporting; and deactivating (810) the SP-CSI reporting in accordance with the determination to deactivate the SP-CSI reporting.

Embodiment 9

The method of embodiment 8 wherein making (808) the determination to deactivate the SP-CSI reporting upon receiving the second control message comprises at least one of: determining whether one or more values in one or more fields of the second control message are the same as one or more values in one or more fields in the control message that activated the SP-CSI reporting; and making the determination (808) to deactivate the SP-CSI reporting upon receiving the second control message if the one or more values in the one or more fields of the second control message are the same as one or more values in one or more fields in the control message that activated the SP-CSI reporting.

Embodiment 10

The method of any one of embodiments 1 to 5 wherein the control message comprises information that indicates whether the control message is for activation of the SP-CSI reporting or for deactivation of the SP-CSI reporting, and making (602) the determination comprises making (1102)

the determination as to whether to activate or deactivate the SP-CSI reporting based on the information comprised in the control message.

Embodiment 11

The method of embodiment 10 wherein the information comprises information comprised in one or more fields of the control message, wherein the one or more fields of the control message are defined for other purposes but are reused to provide an indication as to whether to activate the SP-CSI reporting or to deactivate the SP-CSI reporting.

Embodiment 12

The method of embodiment 11 wherein the one or more fields comprise one or more fields defined for the purpose of providing a new data indicator and/or a redundancy version.

Embodiment 13

The method of embodiment 11 or 12 wherein the one or more fields comprise at least one of: a field defined for the purpose of communicating a transmission power control command for a physical uplink shared channel, a field defined for the purpose of communicating a Hybrid Automatic Repeat Request, HARQ, process number, a field defined for the purpose of communicating a Modulation and Coding Scheme, MCS, and redundancy version, and/or a field defined for the purpose of communicating a time domain resource assignment.

Embodiment 14

The method of embodiment 10 wherein the information comprises one or more bits in a CSI Request field.

Embodiment 15

The method of embodiment 10 wherein the information comprises information that indicates a SP-CSI trigger state, wherein separate SP-CSI trigger states are predefined or preconfigured for activation of the SP-CSI reporting and deactivation of the SP-CSI reporting.

Embodiment 16

The method of embodiment 10 wherein the information comprises a codepoint in a CSI Request field.

Embodiment 17

The method of embodiment 16 wherein the codepoint comprises a CSI request field with all zeros.

Embodiment 18

The method of any one of embodiments 1 to 5 wherein: the control message comprises information that, together with a current state of the wireless device (512), indicates whether the control message is for activation of the SP-CSI reporting or for deactivation of the SP-CSI reporting and whether the control message is for activation of uplink grant free data transmission or deactivation of uplink grant free data transmission; and making (602) the determination comprises making (1302) the determination as to whether to activate or deactivate the SP-CSI reporting and whether to activate or deactivate uplink grant free data transmission based on the information comprised in the control message and the current state of the wireless device (512).

Embodiment 19

The method of embodiment 18 wherein the current state of the wireless device (512) is: a state in which the SP-CSI reporting is deactivated and uplink grant free data transmission is deactivated; a state in which the SP-CSI reporting is deactivated and uplink grant free data transmission is activated; or a state in which the SP-CSI reporting is activated and uplink grant free data transmission is activated.

Embodiment 20

The method of any of the previous embodiments, further comprising: providing user data; and/or forwarding the user data to a host computer via the transmission to a base station.

Group B Embodiments

Embodiment 21

A method performed by a base station (502) for enabling activation or deactivation of Semi-Persistent Channel State Information, SP-CSI, reporting in a wireless communication system, the method comprising: sending (600), to a wireless device (512), a control message for activation or deactivation of SP-CSI reporting.

Embodiment 22

The method of embodiment 21 wherein the control message is a downlink control information message.

Embodiment 23

The method of embodiment 21 or 22 wherein the control message is scrambled with an identity of the wireless device (512).

Embodiment 24

The method of embodiment 21 or 22 wherein the control message is scrambled with an identity of the wireless device (512) that is associated with the SP-CSI reporting.

Embodiment 25

The method of embodiment 21 or 22 wherein the control message is scrambled with a SP-CSI cell radio network temporary identifier of the wireless device (512).

Embodiment 26

The method of any one of embodiments 21 to 25 wherein: the control message is a first control message sent to the wireless device (512) for activation or deactivation of the SP-CSI reporting, wherein, by being the first control message, the control message serves as an indication to the wireless device (512) to activate the SP-CSI reporting.

Embodiment 27

The method of embodiment 26 further comprising: sending (806), to the wireless device (512), a second control message for activation or deactivation of the SP-CSI reporting, wherein, by being the second control message, the second control message serves as an indication to the wireless device (512) to deactivate the SP-CSI reporting.

Embodiment 28

The method of embodiment 26 further comprising: sending (806), to the wireless device (512), a second control message for activation or deactivation of the SP-CSI reporting, wherein, optionally: one or more values in one or more fields of the second control message are the same as one or more values in the one or more fields in the first control message that served as an indication to activate the SP-CSI reporting; and/or the second control message, by being the second control message and by comprising one or more values in one or more fields of the second control message that are the same as the one or more values in the one or more fields in the first control message, serves as an indication to the wireless device (512) to deactivate the SP-CSI reporting.

Embodiment 29

The method of any one of embodiments 21 to 25 wherein the control message comprises information that indicates whether the control message is for activation of the SP-CSI reporting or for deactivation of the SP-CSI reporting.

Embodiment 30

The method of embodiment 29 wherein the information comprises information comprised in one or more fields of the control message, wherein, optionally, the one or more fields of the control message are defined for other purposes but are reused to provide an indication as to whether to activate the SP-CSI reporting or to deactivate the SP-CSI reporting.

Embodiment 31

The method of embodiment 30 wherein the one or more fields comprise one or more fields defined for the purpose of providing a new data indicator and/or a redundancy version.

Embodiment 32

The method of embodiment 30 or 31 wherein the one or more fields comprise at least one of: a field defined for the purpose of communicating a transmission power control command for a physical uplink shared channel, a field defined for the purpose of communicating a Hybrid Automatic Repeat Request, HARQ, process number, a field defined for the purpose of communicating a Modulation and Coding Scheme, MCS, and redundancy version, and/or a field defined for the purpose of communicating a time domain resource assignment.

Embodiment 33

The method of embodiment 29 wherein the information comprises one or more bits in a CSI Request field.

Embodiment 34

The method of embodiment 29 wherein the information comprises information that indicates a SP-CSI trigger state, wherein, optionally, separate SP-CSI trigger states are predefined or preconfigured for activation of the SP-CSI reporting and deactivation of the SP-CSI reporting.

Embodiment 35

The method of embodiment 29 wherein the information comprises a codepoint in a CSI Request field.

Embodiment 36

The method of embodiment 35 wherein the codepoint comprises a CSI request field with all zeros.

Embodiment 37

The method of any one of embodiments 21 to 25 wherein the control message comprises information that, together with a current state of the wireless device (512), indicates whether the control message is for activation of the SP-CSI reporting or for deactivation of the SP-CSI reporting and whether the control message is for activation of uplink grant free data transmission or deactivation of uplink grant free data transmission.

Embodiment 38

The method of embodiment 37 wherein the current state of the wireless device (512) is: a state in which the SP-CSI reporting is deactivated and uplink grant free data transmission is deactivated; a state in which the SP-CSI reporting is deactivated and uplink grant free data transmission is activated; or a state in which the SP-CSI reporting is activated and uplink grant free data transmission is activated.

Embodiment 39

The method of any of the previous embodiments, further comprising: obtaining user data; and forwarding the user data to a host computer or the wireless device.

Group C Embodiments

Embodiment 40

A wireless device for validating a control message for activation or deactivation of Semi-Persistent Channel State Information, SP-CSI, reporting in a wireless communication system, the wireless device comprising: processing circuitry configured to perform any of the steps of any of the Group A embodiments; and power supply circuitry configured to supply power to the wireless device.

Embodiment 41

A base station for enabling activation or deactivation of Semi-Persistent Channel State Information, SP-CSI, reporting in a wireless communication system, the base station comprising: processing circuitry configured to perform any of the steps of any of the Group B embodiments; and power supply circuitry configured to supply power to the base station.

Embodiment 42

A User Equipment, UE, for validating a control message for activation or deactivation of Semi-Persistent Channel State Information, SP-CSI, reporting in a wireless communication system, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 43

A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 44

The communication system of the previous embodiment further including the base station.

Embodiment 45

The communication system of the previous 2 embodiments, further including the UE, wherein the UE is configured to communicate with the base station.

Embodiment 46

The communication system of the previous 3 embodiments, wherein: the processing circuitry of the host computer is configured to execute a host application, thereby providing the user data; and the UE comprises processing circuitry configured to execute a client application associated with the host application.

Embodiment 47

A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 48

The method of the previous embodiment, further comprising, at the base station, transmitting the user data.

Embodiment 49

The method of the previous 2 embodiments, wherein the user data is provided at the host computer by executing a host application, the method further comprising, at the UE, executing a client application associated with the host application.

Embodiment 50

A User Equipment, UE, configured to communicate with a base station, the UE comprising a radio interface and processing circuitry configured to perform the method of the previous 3 embodiments.

Embodiment 51

A communication system including a host computer comprising: processing circuitry configured to provide user data; and a communication interface configured to forward the user data to a cellular network for transmission to a User Equipment, UE; wherein the UE comprises a radio interface and processing circuitry, the UE's components configured to perform any of the steps of any of the Group A embodiments.

Embodiment 52

The communication system of the previous embodiment, wherein the cellular network further includes a base station configured to communicate with the UE.

Embodiment 53

The communication system of the previous 2 embodiments, wherein: the processing circuitry of the host computer is configured to execute a host application, thereby providing the user data; and the UE's processing circuitry is configured to execute a client application associated with the host application.

Embodiment 54

A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 55

The method of the previous embodiment, further comprising at the UE, receiving the user data from the base station.

Embodiment 56

A communication system including a host computer comprising: a communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 57

The communication system of the previous embodiment, further including the UE.

Embodiment 58

The communication system of the previous 2 embodiments, further including the base station, wherein the base station comprises: a radio interface configured to communicate with the UE; and a communication interface configured to forward to the host computer the user data carried by a transmission from the UE to the base station.

Embodiment 59

The communication system of the previous 3 embodiments, wherein: processing circuitry of the host computer is configured to execute a host application; and the UE's processing circuitry is configured to execute a client application associated with the host application, thereby providing the user data.

Embodiment 60

The communication system of the previous 4 embodiments, wherein: the processing circuitry of the host computer is configured to execute the host application, thereby providing request data; and the UE's processing circuitry is configured to execute a client application associated with the host application, thereby providing the user data in response to the request data.

Embodiment 61

A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 62

The method of the previous embodiment, further comprising, at the UE, providing the user data to the base station.

Embodiment 63

The method of the previous 2 embodiments, further comprising: at the UE, executing a client application, thereby providing the user data to be transmitted; and at the host computer, executing a host application associated with the client application.

Embodiment 64

The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 65

A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 66

The communication system of the previous embodiment further including the base station.

Embodiment 67

The communication system of the previous 2 embodiments, further including the UE, wherein the UE is configured to communicate with the base station.

Embodiment 68

The communication system of the previous 3 embodiments, wherein: the processing circuitry of the host computer is configured to execute a host application; and the UE is configured to execute a client application associated with the host application, thereby providing the user data to be received by the host computer.

Embodiment 69

A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 70

The method of the previous embodiment, further comprising at the base station, receiving the user data from the UE.

Embodiment 71

The method of the previous 2 embodiments, further comprising at the base station, initiating a transmission of the received user data to the host computer.

Group D Embodiments

Embodiment 72

A method of validating a control message for activation or deactivation of a Semi-Persistent Channel State Information, SP-CSI, reporting in a wireless network comprising at least a network node (502) and a wireless device (512), the method comprising at least one of: sending, by the network node (502) to the wireless device (512), the message with at least one bit field indicating either activation or deactivation of a SP-CSI reporting; receiving, by the wireless device (512), the message; and determining, by the wireless device (512), whether the message is for SP-CSI activation or deactivation.

Embodiment 73

The method of embodiment 72, wherein the message comprises a plurality of bit fields.

Embodiment 74

The method of embodiment 72, wherein the message is scrambled by a SP-CSI Cell Radio Network Temporary Identifier, C-RNTI.

Embodiment 75

The method of embodiment 73, wherein the size of each of the bit fields is predetermined for purposes other than SP-CSI.

Embodiment 76

The method of embodiment 72, wherein the at least one bit field has different values for activation and deactivation.

Embodiment 77

The method of embodiment 72, wherein the determining comprises verifying that the message is scrambled by a SP-CSI Cell Radio Network Temporary Identifier, C-RNTI, and/or comparing the value of the at least one bit field to a predetermined value for SP-CSI activation or deactivation.

Embodiment 78

The method of embodiment 72, wherein the sending the message comprises transmitting the message over a Physical Downlink Control Channel, PDCCH.

Embodiment 79

The method of embodiment 72, wherein the receiving comprises decoding the message.

Embodiment 80

The method of embodiment 72, wherein the at least one bit field is one of: a New Data Indicator; a Redundancy Version; a Transmission Power Control, TPC, Command for scheduled Physical Uplink Shared Channel, PUSCH; a Hybrid Automatic Repeat Request, HARQ, process number; a modulation and coding scheme and redundancy version; a frequency domain resource assignment; and a time domain resource assignment.

Embodiment 81

A method of validating a control message for activation or deactivation of Semi-Persistent Channel State Information, SP-CSI, reporting in a wireless network comprising at least a network node (502) and a wireless device (512), the method comprising at least one of: sending, by the network node (502) to the wireless device (512), a first message to active a SP-CSI reporting and a second message to deactivate the SP-CSI reporting; receiving, by the wireless device (512), the first and the second messages; and determining, by the wireless device (512), the first message is for activation and the second message for deactivation.

Embodiment 82

The method of embodiment 81, wherein the second message is sent at a later time after the first message.

Embodiment 83

The method of embodiment 81, wherein the first and the second messages are scrambled by a SP-CSI Cell Radio Network Temporary Identifier, C-RNTI.

Embodiment 84

The method of embodiment 81, wherein the determining comprises verifying that the message is scrambled by the SP-CSI Cell Radio Network Temporary Identifier, C-RNTI, and/or checking whether there is an ongoing SP-CSI reporting after having received the message for the SP-CSI, and, optionally, if there is one, determining the received message is for deactivation of the SP-CSI, otherwise, determining the received message is for activation of an SP-CSI.

Embodiment 85

The method of embodiment 81, wherein the sending the message comprises transmitting the message over a Physical Downlink Control Channel, PDCCH.

Embodiment 86

The method of embodiment 81, wherein the receiving comprises decoding the message.

Embodiment 87

A method of validating a control message for activation or deactivation of a Semi-Persistent Channel State Information, SP-CSI, reporting in a wireless network comprising at least a wireless network node (502) and a wireless device (512), the method comprising at least one of: sending, by the network node (502) to the wireless device (512), a message with one bit to indicate activation or deactivation of a SP-CSI reporting; receiving, by the wireless device (512), the message; and determining, by the wireless device (512), whether the message is for activation or deactivation.

Embodiment 88

The method of embodiment 87, wherein the message comprises a plurality of bit fields.

Embodiment 89

The method of embodiment 87, wherein the message is scrambled by a SP-CSI Cell Radio Network Temporary Identifier, C-RNTI.

Embodiment 90

The method of embodiment 87, wherein one of a plurality of bit fields is a Channel State Information, CSI, request field.

Embodiment 91

The method of embodiments 87 to 88, wherein the one bit is part of the Channel State Information, CSI, request field.

Embodiment 92

A method of validating a control message for activation or deactivation of a Semi-Persistent Channel State Information, SP-CSI, reporting in a wireless network comprising at least a wireless network node (502) and a wireless device (512), the method comprising at least one of: configuring, by the network node (502), a plurality of SP-CSI report trigger states for the wireless device (512); sending, by the network node, a message to the wireless device (512) to indicate one of the plurality of SP-CSI report trigger states for SP-CSI reporting; receiving, by the wireless device (512), the message; and determining, by the wireless device (512), whether the message is for activation or deactivation.

Embodiment 93

The method of embodiment 92, wherein each of the plurality of SP-CSI report trigger states comprises an indication of either for activation or deactivation of a SP-CSI reporting.

Embodiment 94

The method of embodiment 92, wherein the configuring comprises signaling via radio resource control signaling.

Embodiment 95

The method of embodiment 92, wherein the message comprises a bit field for selecting one of the plurality of SP-CSI report trigger states.

Embodiment 96

The method of embodiment 92, wherein a bit field is a Channel State Information, CSI, request field.

Embodiment 97

The method of embodiment 92, wherein the sending a message comprises transmitting the message over a Physical Downlink Control Channel, PDCCH.

Embodiment 98

The method of embodiment 92, wherein the receiving comprises decoding the message.

Embodiment 99

The method of embodiment 92, wherein the determining comprises verifying that the message is scrambled by the SP-CSI Cell Radio Network Temporary Identifier, C-RNTI, and/or looking up the value of the bit field in the plurality of SP-CSI report trigger states.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- A-CSI Aperiodic Channel State Information
- AP Access Point
- ASIC Application Specific Integrated Circuit
- CE Control Element
- CORESET Control Resource Set
- CP Cyclic Prefix
- CPU Central Processing Unit
- CQI Channel Quality Indicator
- CRC Cyclic Redundancy Check
- C-RNTI Cell Radio Network Temporary Identifier
- CS Configured Scheduling
- CSI Channel State Information
- CSI-RS Channel State Information Reference Signal
- DCI Downlink Control Information
- DFT Discrete Fourier Transform
- DMRS Demodulation Reference Signal
- DSP Digital Signal Processor
- eNB Enhanced or Evolved Node B
- FPGA Field Programmable Gate Array
- GHz Gigahertz
- gNB New Radio Base Station
- HARQ Hybrid Automatic Repeat Request
- kHz Kilohertz
- LTE Long Term Evolution
- MAC Medium Access Control
- MCS Modulation and Coding Scheme
- MHz Megahertz
- mmW Millimeter Wave
- MME Mobility Management Entity
- MTC Machine Type Communication
- NDI New Data Indication
- NR New Radio
- OFDM Orthogonal Frequency Division Multiplexing
- OTT Over-the-Top
- P-CSI Periodic Channel State Information
- PDCCH Physical Downlink Control Channel
- PDCP Packet Data Convergence Protocol
- PDSCH Physical Downlink Shared Channel
- P-GW Packet Data Network Gateway
- PHY Physical
- PMI Precoding Matrix Indicator
- PUCCH Physical Uplink Control Channel
- PUSCH Physical Uplink Shared Channel
- RAN Radio Access Network
- RAM Random Access Memory
- RB Resource Block
- RE Resource Element
- RI Rank Indicator
- RLC Radio Link Control
- RNTI Radio Network Temporary Identifier
- ROM Read Only Memory
- RRC Radio Resource Control
- RRH Remote Radio Head
- SCEF Service Capability Exposure Function
- SDAP Service Data Adaptation Protocol
- SFN System Frame Number
- SP-CSI Semi-Persistent Channel State Information
- SPS Semi-Persistent Scheduling
- TB Transport Block
- TPC Transmission Power Control
- Tx Transmit
- UCI Uplink Control Information
- UE User Equipment
- UL Uplink
- UL-SCH Uplink Shared Channel
- UL-TWG Uplink Transmission Without a Grant Those skilled in the art will recognize improvements and modifications to the embodiments of the present disclosure. All such improvements and modifications are considered within the scope of the concepts disclosed herein.

What is claimed is:

1. A method for a user equipment for Semi-Persistent Channel State Information, SP-CSI, reporting in a wireless communication system, the method comprising:
   receiving a control message for activation or deactivation of the SP-CSI reporting,
   wherein:
      one or more Cyclic Redundancy Check, CRC, bits of the control message is scrambled with a SP-CSI Cell Radio Network Temporary Identifier, SP-CSI-RNTI, of the wireless device; and
      the control message comprises information that indicates whether the control message is for activation of the SP-CSI reporting or for deactivation of the SP-CSI reporting, wherein the information comprises bit values configured in one or more bit fields of the control message and the one or more bit fields comprise one or more bit fields defined for the purpose of providing a new data indicator and/or a redundancy version;
   making, based on the information comprised in the control message, a determination as to whether to activate the SP-CSI reporting or to deactivate the SP-CSI reporting; and
   activating or deactivating the SP-CSI reporting in accordance with the determination.

2. The method of claim 1 wherein the control message comprises downlink control information carried on a physical downlink control channel.

3. The method of claim 1 wherein the one or more bit fields of the control message are defined for other purposes but are reused.

4. A method for a user equipment for Semi-Persistent Channel State Information, SP-CSI, reporting in a wireless communication system, the method comprising:
   receiving a control message for activation or deactivation of the SP-CSI reporting, wherein:
      one or more Cyclic Redundancy Check, CRC, bits of the control message is scrambled with a SP-CSI Cell Radio Network Temporary Identifier, SP-CSI-RNTI, of the wireless device; and
      the control message comprises information that indicates whether the control message is for activation of the SP-CSI reporting or for deactivation of the SP-CSI reporting, wherein the information comprises bit values configured in one or more bit fields of the control message;
   making, based on the information comprised in the control message, a determination as to whether to activate the SP-CSI reporting or to deactivate the SP-CSI reporting; and
   activating or deactivating the SP-CSI reporting in accordance with the determination, wherein, when activating the SP-CSI reporting, the one or more bits fields for activating the SP-CSI reporting comprise any one or more of the following bit fields:
      a field defined for the purpose of communicating a New Data Indicator;
      a field defined for the purpose of communicating a Redundancy Version;
      a field defined for the purpose of communicating a transmission power control command for a physical uplink shared channel; and
      a field defined for the purpose of communicating a Hybrid Automatic Repeat Request, HARQ process number.

5. The method of claim 4 wherein the control message comprises downlink control information carried on a physical downlink control channel.

6. A method for a user equipment for Semi-Persistent Channel State Information, SP-CSI, reporting in a wireless communication system, the method comprising:
   receiving a control message for activation or deactivation of the SP-CSI reporting, wherein:
      one or more Cyclic Redundancy Check, CRC, bits of the control message is scrambled with a SP-CSI Cell Radio Network Temporary Identifier, SP-CSI-RNTI, of the wireless device; and
      the control message comprises information that indicates whether the control message is for activation of the SP-CSI reporting or for deactivation of the SP-CSI reporting, wherein the information comprises bit values configured in one or more bit fields of the control message;
   making, based on the information comprised in the control message, a determination as to whether to activate the SP-CSI reporting or to deactivate the SP-CSI reporting; and
   activating or deactivating the SP-CSI reporting in accordance with the determination, wherein, when deactivating the SP-CSI reporting, the one or more bit fields for deactivating the SP-CSI reporting comprise any one or more of the following bit fields:
      a field defined for the purpose of communicating a New Data Indicator;
      a field defined for the purpose of communicating a Redundancy Version;
      a field defined for the purpose of communicating a transmission power control command for a physical uplink shared channel;
      a field defined for the purpose of communicating a Hybrid Automatic Repeat Request, HARQ process number;
      a field defined for the purpose of communicating a Modulation and Coding Scheme, MCS;
      a field defined for the purpose of communicating a frequency domain resource assignment; and
      a field defined for the purpose of communicating a time domain resource assignment.

7. The method of claim 6 wherein the control message comprises downlink control information carried on a physical downlink control channel.

8. A user equipment for Semi-Persistent Channel State Information, SP-CSI, reporting in a wireless communication system, the user equipment comprising:
   one or more transmitters and one or more receivers; and
   processing circuitry associated with the one or more transmitters and the one or more receivers, the processing circuitry configured to cause the user equipment to:
      receive a control message for activation or deactivation of the SP-CSI reporting, wherein:
         one or more Cyclic Redundancy Check, CRC, bits of the control message is scrambled with a SP-CSI Cell Radio Network Temporary Identifier, SP-CSI-RNTI, of the user equipment; and
         the control message comprises information that indicates whether the control message is for activation of the user equipment SP-CSI reporting or for deactivation of the user equipment SP-CSI reporting, wherein the information comprises bit values configured in one or more bit fields of the control message and the one or more bit fields comprise one or more bit fields defined for the purpose of providing a new data indicator and/or a redundancy version;

make, based on the information comprised in the control message, a determination as to whether to activate the SP-CSI reporting or to deactivate the SP-CSI reporting; and activate or deactivate the SP-CSI reporting in accordance with the determination.

9. The user equipment SP-CSI reporting of claim 8 wherein the control message comprises downlink control information carried on a physical downlink control channel.

10. A method for a base station for enabling activation or deactivation of Semi-Persistent Channel State Information, SP-CSI, reporting in a wireless communication system, the method comprising:

sending, to a wireless device, a control message for activation or deactivation of SP-CSI reporting, wherein:

one or more Cyclic Redundancy Check, CRC, bits of the control message is scrambled with a SP-CSI Cell Radio Network Temporary Identifier, SP-CSI-RNTI, of the wireless device; and the control message comprises information that indicates whether the control message is for activation of the SP-CSI reporting or for deactivation of the SP-CSI reporting, wherein the information comprises bit values configured in one or more bit fields of the control message and the one or more bit fields comprise one or more bit fields defined for the purpose of providing a new data indicator and/or a redundancy version.

11. The method of claim 10 wherein the control message comprises downlink control information carried on a physical downlink control channel.

12. The method of claim 10 wherein the one or more bit fields of the control message are defined for other purposes but are reused.

13. A method for a base station for enabling activation or deactivation of Semi-Persistent Channel State Information, SP-CSI, reporting in a wireless communication system, the method comprising:

sending, to a wireless device, a control message for activation or deactivation of SP-CSI reporting, wherein:

one or more Cyclic Redundancy Check, CRC, bits of the control message is scrambled with a SP-CSI Cell Radio Network Temporary Identifier, SP-CSI-RNTI, of the wireless device; and the control message comprises information that indicates whether the control message is for activation of the SP-CSI reporting or for deactivation of the SP-CSI reporting, wherein the information comprises bit values configured in one or more bit fields of the control message;

wherein, when activating the SP-CSI reporting, the one or more bits fields for activating the SP-CSI comprise any one or more of the following bit fields:

a field defined for the purpose of communicating a New Data Indicator;

a field defined for the purpose of communicating a Redundancy Version;

a field defined for the purpose of communicating a transmission power control command for a physical uplink shared channel; and a field defined for the purpose of communicating a Hybrid Automatic Repeat Request, HARQ process number.

14. The method of claim 13 wherein the control message comprises downlink control information carried on a physical downlink control channel.

15. A method for a base station for enabling activation or deactivation of Semi-Persistent Channel State Information, SP-CSI, reporting in a wireless communication system, the method comprising:

sending, to a wireless device, a control message for activation or deactivation of SP-CSI reporting, wherein:

one or more Cyclic Redundancy Check, CRC, bits of the control message is scrambled with a SP-CSI Cell Radio Network Temporary Identifier, SP-CSI-RNTI, of the wireless device; and the control message comprises information that indicates whether the control message is for activation of the SP-CSI reporting or for deactivation of the SP-CSI reporting, wherein the information comprises bit values configured in one or more bit fields of the control message;

wherein, when deactivating the SP-CSI reporting, the one or more bit fields for deactivating the SP-CSI reporting comprise any one or more of the following bit fields:

a field defined for the purpose of communicating a New Data Indicator;

a field defined for the purpose of communicating a Redundancy Version;

a field defined for the purpose of communicating a transmission power control command for a physical uplink shared channel;

a field defined for the purpose of communicating a Hybrid Automatic Repeat Request, HARQ process number;

a field defined for the purpose of communicating a Modulation and Coding Scheme, MCS;

a field defined for the purpose of communicating a frequency domain resource assignment; and a field defined for the purpose of communicating a time domain resource assignment.

16. The method of claim 15 wherein the control message comprises downlink control information carried on a physical downlink control channel.

17. A base station for enabling activation or deactivation of Semi-Persistent Channel State Information, SP-CSI, reporting in a wireless communication system, the base station comprising:

processing circuitry configured to cause the base station to send, to a wireless device, a control message for activation or deactivation of SP-CSI reporting, wherein:

one or more Cyclic Redundancy Check, CRC, bits of the control message is scrambled with a SP-CSI Cell Radio Network Temporary Identifier, SP-CSI-RNTI, of the wireless device; and the control message comprises information that indicates whether the control message is for activation of the SP-CSI reporting or for deactivation of the SP-CSI reporting, wherein the information comprises bit values configured in one or more bit fields of the control message and the one or more bit fields comprise one or more bit fields defined for the purpose of providing a new data indicator and/or a redundancy version.

18. The base station of claim 17 wherein the control message comprises downlink control information carried on a physical downlink control channel.

19. A user equipment for Semi-Persistent Channel State Information, SP-CSI, reporting in a wireless communication system, the user equipment comprising:
one or more transmitters and one or more receivers; and
processing circuitry associated with the one or more transmitters and the one or more receivers, the processing circuitry configured to cause the user equipment to:
receive a control message for activation or deactivation of the SP-CSI reporting, wherein:
one or more Cyclic Redundancy Check, CRC, bits of the control message is scrambled with a SP-CSI Cell Radio Network Temporary Identifier, SP-CSI-RNTI, of the user equipment; and
the control message comprises information that indicates whether the control message is for activation of the SP-CSI reporting or for deactivation of the SP-CSI reporting, wherein the information comprises bit values configured in one or more bit fields of the control message;
make, based on the information comprised in the control message, a determination as to whether to activate the SP-CSI reporting or to deactivate the SP-CSI reporting; and
activate or deactivate the SP-CSI reporting in accordance with the determination, wherein, when activating the SP-CSI reporting, the one or more bits fields for activating the SP-CSI reporting comprise any one or more of the following bit fields:
a field defined for the purpose of communicating a New Data Indicator;
a field defined for the purpose of communicating a Redundancy Version;
a field defined for the purpose of communicating a transmission power control command for a physical uplink shared channel; and
a field defined for the purpose of communicating a Hybrid Automatic Repeat Request, HARQ, process number.

20. The user equipment of claim 19 wherein the control message comprises downlink control information carried on a physical downlink control channel.

21. A user equipment for Semi-Persistent Channel State Information, SP-CSI, reporting in a wireless communication system, the user equipment comprising:
one or more transmitters and one or more receivers; and
processing circuitry associated with the one or more transmitters and the one or more receivers, the processing circuitry configured to cause the user equipment to:
receive a control message for activation or deactivation of the SP-CSI reporting, wherein:
one or more Cyclic Redundancy Check, CRC, bits of the control message is scrambled with a SP-CSI Cell Radio Network Temporary Identifier, SP-CSI-RNTI, of the user equipment; and
the control message comprises information that indicates whether the control message is for activation of the SP-CSI reporting or for deactivation of the SP-CSI reporting, wherein the information comprises bit values configured in one or more bit fields of the control message;
make, based on the information comprised in the control message, a determination as to whether to activate the SP-CSI reporting or to deactivate the SP-CSI reporting; and
activate or deactivate the SP-CSI reporting in accordance with the determination, wherein, when deactivating the SP-CSI reporting, the one or more bit fields for deactivating the SP-CSI reporting comprise any one or more of the following bit fields:
a field defined for the purpose of communicating a New Data Indicator;
a field defined for the purpose of communicating a Redundancy Version;
a field defined for the purpose of communicating a transmission power control command for a physical uplink shared channel;
a field defined for the purpose of communicating a Hybrid Automatic Repeat Request, HARQ, process number;
a field defined for the purpose of communicating a Modulation and Coding Scheme, MCS;
a field defined for the purpose of communicating a frequency domain resource assignment; and
a field defined for the purpose of communicating a time domain resource assignment.

22. The user equipment of claim 21 wherein the control message comprises downlink control information carried on a physical downlink control channel.

23. A base station for enabling activation or deactivation of Semi-Persistent Channel State Information, SP-CSI, reporting in a wireless communication system, the base station comprising:
processing circuitry configured to cause the base station to send, to a wireless device, a control message for activation or deactivation of SP-CSI reporting, wherein:
one or more Cyclic Redundancy Check, CRC, bits of the control message is scrambled with a SP-CSI Cell Radio Network Temporary Identifier, SP-CSI-RNTI, of the wireless device; and
the control message comprises information that indicates whether the control message is for activation of the SP-CSI reporting or for deactivation of the SP-CSI reporting, wherein the information comprises bit values configured in one or more bit fields of the control message;
wherein, when activating the SP-CSI reporting, the one or more bits fields for activating the SP-CSI reporting comprise any one or more of the following bit fields:
a field defined for the purpose of communicating a New Data Indicator;
a field defined for the purpose of communicating a Redundancy Version;
a field defined for the purpose of communicating a transmission power control command for a physical uplink shared channel; and
a field defined for the purpose of communicating a Hybrid Automatic Repeat Request, HARQ process number.

24. The base station of claim 23 wherein the control message comprises downlink control information carried on a physical downlink control channel.

25. A base station for enabling activation or deactivation of Semi-Persistent Channel State Information, SP-CSI, reporting in a wireless communication system, the base station comprising:
processing circuitry configured to cause the base station to send, to a wireless device, a control message for activation or deactivation of SP-CSI reporting, wherein:

one or more Cyclic Redundancy Check, CRC, bits of the control message is scrambled with a SP-CSI Cell Radio Network Temporary Identifier, SP-CSI-RNTI, of the wireless device; and the control message comprises information that indicates whether the control message is for activation of the SP-CSI reporting or for deactivation of the SP-CSI reporting, wherein the information comprising bit values configured in one or more bit fields of the control message;

wherein, when deactivating the SP-CSI reporting, the one or more bit fields for deactivating the SP-CSI reporting comprise any one or more of the following bit fields:

a field defined for the purpose of communicating a New Data Indicator;

a field defined for the purpose of communicating a Redundancy Version;

a field defined for the purpose of communicating a transmission power control command for a physical uplink shared channel;

a field defined for the purpose of communicating a Hybrid Automatic Repeat Request, HARQ process number;

a field defined for the purpose of communicating a Modulation and Coding Scheme, MCS;

a field defined for the purpose of communicating a frequency domain resource assignment; and a field defined for the purpose of communicating a time domain resource assignment.

26. The base station of claim 25 wherein the control message comprises downlink control information carried on a physical downlink control channel.

* * * * *